United States Patent
Ishida et al.

[11] Patent Number: 5,905,759
[45] Date of Patent: May 18, 1999

[54] DATA DECODING CIRCUIT, VOLTAGE-CONTROLLED OSCILLATION CIRCUIT, DATA DECODING SYSTEM AND ELECTRONIC EQUIPMENT

[75] Inventors: Takuya Ishida; Kanji Aoki, both of Suwa, Japan

[73] Assignee: Seiko Epson Corporation, Tokyo, Japan

[21] Appl. No.: 08/691,033

[22] Filed: Aug. 7, 1996

[30] Foreign Application Priority Data

Aug. 10, 1995 [JP] Japan .................................. 7-204545
Aug. 2, 1996 [JP] Japan .................................. 8-220486

[51] Int. Cl.⁶ ......................... H04L 27/22; H04L 7/033; H03D 3/24
[52] U.S. Cl. ......................... 375/282; 375/333; 375/360; 375/361; 375/376; 327/156; 331/DIG. 3; 331/57; 331/173; 331/187
[58] Field of Search ................... 375/340, 364, 375/359, 341, 333, 360, 361, 376, 282; 370/452, 245, 253, 507, 517; 327/156; 331/57, 173, DIG. 3, 187

[56] References Cited

U.S. PATENT DOCUMENTS

| | | | |
|---|---|---|---|
| 5,363,366 | 11/1994 | Wisdom, Jr. et al. | 370/245 |
| 5,581,556 | 12/1996 | Ohie | 375/340 |
| 5,588,027 | 12/1996 | Lim | 375/341 |
| 5,646,562 | 7/1997 | Abe | 327/156 |

FOREIGN PATENT DOCUMENTS

| | | |
|---|---|---|
| A-60-227541 | 11/1985 | Japan . |
| A-62-241435 | 10/1987 | Japan . |
| A-63-191433 | 8/1988 | Japan . |
| B2-3-3429 | 1/1991 | Japan . |
| A-5-14333 | 1/1993 | Japan . |

*Primary Examiner*—Amanda Le
*Attorney, Agent, or Firm*—Oliff & Berridge, PLC

[57] ABSTRACT

A data decoding circuit of the present invention can regenerate a bit synchronization signal from a data received by using a code such as a split-phase code and Manchester code in which a binary value can be detected through a transition of voltage at a central area of a bit cell and transform the received data into a serial binary data. The data decoding circuit includes an edge detection section for detecting a transition point in the received data; a pulse generating section for generating a phase comparing timing signal having a pulse width of substantially 1/(4×fs) when fs is a data transfer frequency and a received data regenerating signal having a pulse width of substantially 1(2×fs) in synchronism with an output of the edge detection means; a phase synchronization oscillation section synchronized in phase with the phase comparing timing signal for outputting a signal having a frequency n times the data transfer frequency fs; and a sampling section including means for generating the bit synchronization signal by dividing a frequency of a signal outputted from the phase synchronization oscillation means into 1/n, means for sampling the received data regenerating signal based on the bit synchronization signal and means for transforming sampled signal into a serial binary data.

33 Claims, 18 Drawing Sheets

DATA DECODING CIRCUIT, VOLTAGE-CONTROLLED OSCILLATION CIRCUIT, DATA DECODING SYSTEM AND ELECTRONIC EQUIPMENT

BACKGROUND OF THE INVENTION

1. Field of the Invention

The present invention relates to a data decoding circuit for regenerating a bit synchronization signal from a data received by using a code such as-split-phase code and Manchester code in which a binary value can be detected through a transition of voltage at a central area of a bit cell and for transforming the received data into a serial binary data.

2. Description of the Related Art

To decode a data of split-phase code, Manchester code or the like, the prior art takes the following procedure. The edge of a received data is first detected by an edge detecting circuit, the output of which is then used to form a bit synchronization signal. A serial binary data was obtained by sampling the received data with the bit synchronization signal.

The bit synchronization signal was formed by a bit synchronization circuit which used a digital or analog phase-locked loop circuit.

One digital phase-locked loop circuit is described in Japanese Patent Application Laid-Open No. 60-227541 while one analog phase-locked loop circuit is described in Japanese Patent Application Laid-Open No. 5-14333.

The other references such as Japanese Patent Application Laid-Open No. 63-191433 and Japanese Patent Publication No. 3-3429 also describe a bit synchronization circuit for obtaining a bit synchronization signal.

When the split-phase code or Manchester code is to be decoded, there are following important conditions for that.

(1) Synchronism recovery time (or the number of data bits required to recover the synchronism) must be reduced when a data for a frame synchronization signal (or preamble data) is received (Japanese Patent Publication No. 3-3429).

(2) Synchronization must not be disturbed when the same data (e.g., one) is continuously inputted info a transferred data (Japanese Patent Application Laid-Open No. 62-241435 or Japanese Patent Application Laid-Open No. 5-14333).

(3) An encoded received data must be capable of being decoded even if it contains a jitter which may be ±18 nsec. at a transfer frequency of 10 MHz in a network according to IEEE 802.3 Standard (Japanese Patent Application Laid-Open No. 60-227541).

(4) The data decoding circuit can be formed easily as a semiconductor device (Japanese Patent Application Laid-Open No. 60-227541, Japanese Patent Publication No. 3-3429 or Japanese Patent Application Laid-Open No. 5-14333).

In order to code a data to be transmitted according to a standard and to transmit the encoded data, the data transmission uses a medium for propagating the encoded data, a transmitter for driving the data propagation medium and a receiver for receiving the encoded data through the medium and for decoding the received data at a receiving circuit to regenerate the original data.

In the prior art, the data decoding circuit digitizes a received return-to-zero (RZ) data at the receiving circuit to sample directly with a bit synchronization signal. The receiving circuit is thus required to reproduce exactly the pulse width, cycle and others of the received data. In other words, they are required to increase the response speed of a comparator used in the receiving circuit and also to bring the offset of the comparator near to zero as much as possible.

Such requirements raised problems in that, the current consumption is increased and that the circuit is increased in scale to make the semiconductor device more expensive.

When the data decoding circuit is formed as a semiconductor device, voltage-controlled oscillation circuit is normally used. It is desirable that even if the oscillation frequency of the voltage-controlled oscillation circuit is lowered, phase synchronization can be accomplished with a high precision.

SUMMARY OF THE INVENTION

It is therefore an object of the present invention to provide a data decoding circuit which can fill the aforementioned conditions (1) to (4) and which can precisely decode a code such as a split-phase code and a Manchester code received by the receiving circuit which is not required to have high performance when it receives a data through a medium.

Another object of the present invention is to provide a voltage-controlled oscillation circuit which can precisely accomplish a phase synchronization even if the oscillation frequency is lowered.

To this end, the present invention provides a data decoding circuit for regenerating a bit synchronization signal from a data received by using a code in which a binary value can be detected through a transition of voltage at a central area of a bit cell and for transforming received data into a serial binary data, the data decoding circuit comprising:

edge detection means for detecting a transition point in the received data;

pulse generating means for generating a phase comparing timing signal having a pulse width of substantially $1/(4 \times fs)$ when fs is a data transfer frequency and a received data regenerating signal having a pulse width of substantially $1/(2 \times fs)$ in synchronism with an output of the edge detection means;

phase synchronization oscillation means synchronized in phase with the phase comparing timing signal for outputting a signal having a frequency which is n times the data transfer frequency fs; and sampling means including means for generating the bit synchronization signal by dividing a frequency of a signal outputted from the phase synchronization oscillation means into 1/n, means for sampling the received data regenerating signal based on the bit synchronization signal and means for transforming sampled signal into the serial binary data.

Codes having their binary value that can be detected through a transition of voltage at a central area 05 a bit cell include Manchester codes, split-phase codes and others.

In such a manner, bit synchronization can be ensured even if the same codes are continuously inputted by generating the phase comparing timing signal from the transition point of the received data and by making the received data of the code to have a frequency component of at least 1/2 times the data transfer frequency fs.

The present invention can exactly perform decoding of data if the received data has a jitter up to $\pm 1/(4 \times fs)$ since the received data regenerating signal having a pulse width of substantially $1/(2 \times fs)$ is sampled with the bit synchronization signal synchronized with the phase comparing timing signal having a pulse width of substantially 1/(4×fs). The word "substantially" is used herein for representing the fact that some error in the pulse width can be included in the acceptable range.

Since the received data regenerating signal and bit synchronization signal are formed from the received data and used to form the serial binary data, the present invention has such an advantage that a comparator used in the receiving circuit for transforming the received signal into a digital signal is not required to have a high precision.

The present invention has another advantage that even if the same data is continuously inputted into the circuit, the synchronization will not be disturbed since the bit synchronization can be accomplished with a frequency of at least 1/2 times the data transfer frequency.

The present invention also provides a data decoding circuit for regenerating a bit synchronization signal from a data received by using a code in which a binary value can be detected through a transition of voltage at a central area of a bit cell and for transforming received data into a serial binary data, the data decoding circuit comprising:

edge detection means for detecting a transition point in the received data;

reference voltage generating means including:
  a first voltage-controlled oscillation circuit which is controlled by an operation control input signal to start and stop an oscillation;
  means for oscillating the first voltage-controlled oscillation circuit with a frequency which is n times a data transfer frequency fs; and
  means for outputting a reference voltage depending on a control voltage of the first voltage-controlled oscillation circuit;

pulse generating means including:
  a second voltage-controlled oscillation circuit having the same structure as in the first voltage-controlled oscillation circuit and being supplied with a control voltage depending on an output of the reference voltage generating means and also supplied with an operation control input signal depending on an output of the edge detection means; and
  means for generating a phase comparing timing signal having a pulse width of substantially 1/(4×fs) and a received data regenerating signal having a pulse width of substantially 1/(2×fs);

phase synchronization oscillation means including:
  a third voltage-controlled oscillation circuit having the same structure as in the first voltage-controlled oscillation circuit and being supplied with a control voltage depending on an output of the reference voltage generating means;
  means for synchronizing the phase comparing timing signal with an output of the third voltage-controlled oscillation circuit; and
  means for outputting a signal which is synchronized in phase with the phase comparing timing signal and has a frequency which is n times the data transfer frequency fs; and sampling means including:
  means for dividing a frequency of a signal outputted from the phase synchronization oscillation means into 1/n to generate the bit synchronization signal;
  means for sampling the received data regenerating signal based on the bit synchronization signal; and
  means for transforming sampled signal into the serial binary data.

In such a manner, bit synchronization can be ensured even if the same codes are continuously inputted by generating the phase comparing timing signal from the transition point of the received data and by making the received data of the code to have a frequency component of at least 1/2 times the data transfer frequency fs.

The present invention can exactly perform decoding of data if the received data has a jitter up to ±1/(4×fs) since the received data regenerating signal having a pulse width of substantially 1/(2×fs) is sampled with the bit synchronization signal synchronized with the phase comparing timing signal having a pulse width of substantially 1/(4×fs).

Since the received data regenerating signal and bit synchronization signal are formed from the received data and used to form the serial binary data, the present invention has such an advantage that a comparator used in the receiving circuit for transforming the received signal into a digital signal is not required to have a high precision.

The present invention has another advantage that even if the same data is continuously inputted into the circuit, the synchronization will not be disturbed since the bit synchronization can be accomplished with a frequency of at least 1/2 times the data transfer frequency.

The present invention further provides additional means for generating an exact timing axis. More particularly, the second and third voltage-controlled oscillation circuits respectively included in the pulse generating means and phase synchronization oscillation means are of the same structure as in the first voltage-controlled oscillation circuit. These voltage-controlled oscillation circuits are responsive to the operation control input signal for controlling the start and stop of the oscillation. Moreover, the reference voltage that is a voltage depending on the control voltage of the first voltage-controlled oscillation circuit is used as the control voltage for the second and third voltage-controlled oscillation circuits.

Therefore, the pulse generating means can easily generate a signal of precise pulse width by dividing the frequency of a signal of the second voltage-controlled oscillation circuit.

The output of the phase synchronization oscillation means is equal to n times the-data transfer frequency fs. Thus, the bit synchronization can be quickly accomplished only by locking the phase with the phase comparing timing signal.

The present invention further provides a data decoding circuit for regenerating a bit synchronization signal from a data received by using a code in which a binary value can be detected through a transition of voltage at a central area of a bit cell and for transforming received data into a serial binary data, the data decoding circuit comprising:

edge detection means for detecting a transition point in said received data;
line monitoring means for detecting a data-received state and a non-data-received state based on an output of the edge detection means;
reference signal generating means including:
  a first voltage-controlled oscillation circuit which is controlled by an operation control input signal to start and stop an oscillation;
  means for oscillating the first voltage-controlled oscillation circuit with a frequency which is n times a data transfer frequency fs for the received data when the non-data-received state is detected by the line monitoring means; and
  means for synchronizing the first voltage-controlled oscillation circuit with a phase comparing timing signal synchronized with the received data and also for oscillating the first voltage-controlled oscillation circuit with a frequency which is n times the data transfer frequency fs;

pulse generating means including:

a second voltage-controlled oscillation circuit of the same structure as in the first voltage-controlled oscillation circuit and being supplied with a control voltage depending on an output of the first voltage-controlled oscillation circuit and with an operation control input signal depending on an output of the edge detection means; and means for generating the phase comparing timing signal having a pulse width of substantially 1/(4×fs) and being synchronized with the received data, and a received data regenerating signal having a pulse width of substantially 1/(2×fs); and sampling means including:

means for dividing a frequency of a signal outputted from the reference signal generating means into 1/n to generate the bit synchronization signal;

means for sampling the received data regenerating signal based on the bit synchronization signal; and means for transforming sampled signal into the serial binary data.

In such an arrangement, the two voltage-controlled oscillation circuits can provide the same functions and advantages as described. This can simplify the data decoding circuit, resulting in reduction of the manufacturing cost thereof.

According to the present invention the phase synchronization oscillation means of the data decoding circuit outputs a signal having a frequency which is n=2m (m:natural number) times the data transfer frequency fs; and wherein the sampling means comprises:

means for generating a preamble sampling signal having a frequency which is two times the data transfer frequency fs and obtained by dividing a frequency of a signal outputted from the phase synchronization oscillation means into 1/m;

means for sampling the received data regenerating signal with the preamble sampling signal and for storing a sampled data;

frame synchronization detecting means for detecting synchronization of the stored sampled data with a frame synchronization data by recognizing that the stored sampled data is a given data;

bit synchronization signal generating means for dividing the preamble sampling signal into 1/2 in synchronism with an output of the frame synchronization detecting means to generate the bit synchronization signal having a frequency equal to the data transfer frequency fs; and means for sampling the received data regenerating signal with the bit synchronization signal after detection of frame synchronization to transform a sampled signal into a non-return-to-zero serial binary data.

According to the present invention, the reference signal generating means of the data decoding circuit outputs a signal having a frequency which is n=2m (m:natural number) times the data transfer frequency fs; and wherein the sampling means comprises:

means for generating a preamble sampling signal having a frequency which is two times the data transfer frequency fs and obtained by dividing a frequency of a signal outputted from the reference signal generating means into 1/m;

means for sampling the received data regenerating signal with the preamble sampling signal and for storing a sampled data;

frame synchronization detecting means for detecting synchronization of the stored sampled data with a frame synchronization data by recognizing that the stored sampled data is a given data;

bit synchronization signal generating means for dividing the preamble sampling signal into 1/2 in synchronism with an output of the frame synchronization detecting means to generate the bit synchronization signal having a frequency equal to the data transfer frequency fs; and means for sampling the received data regenerating signal with the bit synchronization signal after detection of frame synchronization to transform a sampled signal into a non-return-to-zero serial binary data.

By sampling the received data regenerating signal with the frequency two times the data transfer frequency and detecting that the sampled data is synchronized with the frame synchronization data, the frame synchronization signal can be exactly detected when a normal frame synchronization signal is inputted into the data decoding circuit and even if a noise is contained in the received signal.

According to the present invention, at least one of the first to third voltage-controlled oscillation circuits of the data decoding circuit comprises:

inverting amplifier circuits equal in number to (2×k+1) (0<k), the inverting amplifier circuits being connected together in a ring;

means for controlling an oscillation frequency generated by the inverting amplifier circuits with an external control voltage;

first switch means for electrically disconnecting between the $N_1$-th inverting amplifier circuit and the $(N_1+1)$-th inverting amplifier circuit among the (2×k+1) inverting amplifier circuits when the operation control input signal is in a first state, and for electrically connecting the first-mentioned two inverting amplifier circuits when the operation control input signal is in a second state, second switch means for electrically disconnecting between the $N_2$-th inverting amplifier circuit and the $(N_2+1)$-th inverting amplifier circuit when the operation control input signal is in the first state and for electrically connecting the last-mentioned two inverting amplifier circuits when the operation control input signal is in the second state, . . . and m-th (m being three or more) switch means for electrically disconnecting between the $N_m$-th inverting amplifier circuit and the $(N_m+1)$-th inverting amplifier circuit when the operation control input signal is in the first state and for electrically connecting the last-mentioned two inverting amplifier circuits when the operation control input signal is in the second state; and first voltage setting means for setting inputs of the $N_1$-th and $(N_1+1)$-th inverting amplifier circuits at the same voltage when the operation control input signal is in the first state, second voltage setting means for setting inputs of the $N_2$-th and $(N_2+1)$-th inverting amplifier circuits at the same voltage when the operation control input signal is in the first state, . . . and m-th voltage setting means for setting inputs of the $N_m$-th and $(N_m+1)$-th inverting amplifier circuits at the same voltage when the operation control input signal is in the first state.

The present invention specifies the structure of the voltage-controlled oscillation circuit in the data decoding circuit. In the voltage-controlled oscillation circuit constructed according to the present invention, the voltage between one of the $N_1$-th to $N_m$-th inverting amplifier circuits and the next inverting amplifier circuit starts at its intermediate level immediately after the corresponding switch has been closed. As a result, the voltage-controlled oscillation circuit can be oscillated at a frequency extremely near the frequency that would be obtained at the stationary oscillation. Even if the oscillation frequency of the voltage-controlled oscillation circuit is lowered, the phase synchronization can be precisely performed and received data regenerating signal can be generated to reduce the current consumption in the data decoding circuit.

In the voltage-controlled oscillation circuit in the data decoding circuit of the present invention, at least one of a ratio of an output load capacity of the $N_1$-th inverting amplifier circuit to an input load capacity of the $(N_1+1)$-th inverting amplifier circuit, a ratio of an output load capacity of the $N_2$-th inverting amplifier circuit to an input load capacity of the $(N_2+1)$-th inverting amplifier circuit, . . . and a ratio of an output load capacity of the $N_m$-th inverting amplifier circuit to an input load capacity of the $(N_m+1)$-th inverting amplifier circuit is different from the others.

As the voltage between one of the between one of the $N_1$-th to $N_m$-th inverting amplifier circuits and the next inverting amplifier circuit at the start of oscillation is nearer the voltage at the stationary oscillation, the voltage-controlled oscillation circuit can oscillate at a frequency nearer the stationary oscillation frequency immediately after the start of oscillation. It is experientially known that the voltage at the stationary oscillation has an intermediate voltage at one point among three points (when m=3), the intermediate voltage at the one point being necessarily different from those of the other two points. Therefore, two or more intermediate voltages different from one another are required to provide a frequency immediately after the start of oscillation that is nearer the stationary oscillation frequency.

According to the present invention, the voltage between one of the $N_1$-th to $N_m$-th inverting amplifier circuits and the next inverting amplifier circuit can be started at any different intermediate voltage immediately after the corresponding switch has been closed. Thus, the voltage-controlled oscillation circuit can oscillate at a frequency nearer the stationary oscillation frequency immediately after the start of oscillation.

In the voltage-controlled oscillation circuit in the data decoding circuit of the present invention, the sum of the output load capacity of the $N_1$-th inverting amplifier circuit and the input load capacity of the $(N_1+1)$-th inverting amplifier circuit, the sum of the output load capacity of the $N_2$-th inverting amplifier circuit and the input load capacity of the $(N_2+1)$-th inverting amplifier circuit, . . . and the sum of the output load capacity of the $N_m$-th inverting amplifier circuit and the input load capacity of the $(N_m+1)$-th inverting amplifier circuit are equalized.

Thus, the duty of oscillation can be equalized. It is further preferable that the same load capacity as the output load capacities of the other inverting amplifier circuits is provided at the intermediate point between two inverting amplifier circuits of which are not required switch function.

The present invention further provides a data decoding system comprising:

received data generating means for receiving a code in which a binary value can be detected through a transition of voltage at a central area of a bit cell as differential signals, and for generating a received data of a digital signal based on the differential signals; and a data decoding circuit as defined in claim 1 which receives the received data, generates a bit synchronization signal from the received data, and transforms the bit synchronization signal into a serial binary data;

wherein the received data generating means comprises:

comparison input voltage generating means for generating a comparison input voltage based on the differential signals; and means for comparing the comparison input voltage generated by the comparison input voltage generating means with a voltage of one of the differential signals to generate the received data of the digital signal.

When the data decoding circuit of the present invention is used, thus, a data decoding system which can generate the received data improved in resistance to small-amplitude noises can be provided by only a single comparator in the received data generating means.

According to the present invention, the comparison input voltage generating means comprises:

means for receiving the differential signals to generate an intermediate voltage; and means for dividing a voltage between the intermediate voltage and a first source voltage.

Thus, an optimum comparison input voltage can be generated.

The present invention further provides an electronic equipment for receiving a code in which a binary value can be detected through a transition of voltage at a central area of voltage in a bit cell as a received signal, the electronic equipment comprising:

data decoding means for decoding the received signal into a decoded data; and means for receiving and processing the decoded data from the data decoding means; and wherein data decoding means includes a data decoding circuit as defined in the present invention.

The present invention further provides an electronic equipment for receiving a code in which a binary value can be detected through a transition of voltage at a central area of a bit cell as differential signals, the electronic equipment comprising:

a data decoding system as defined in the present invention which receives the differential signals to decode data of the differential signals; and means for receiving and processing a data decoded by the data decoding system.

In this manner, by using the data decoding circuit or the data decoding system of the present invention, an electronic equipment can be improved in resistance to noises and reduction of the manufacturing cost and current consumption.

The present invention further provides a voltage-controlled oscillation circuit comprising:

inverting amplifier circuits equal in number to $(2 \times k+1)$ $(0<k)$, the inverting amplifier circuits being connected together in a ring;

means for controlling an oscillation frequency generated by the inverting amplifier circuits with an external control voltage;

first switch means for electrically disconnecting between the $N_1$-th inverting amplifier circuit and the $(N_1+1)$-th inverting amplifier circuit among the $(2 \times k+1)$ inverting amplifier circuits when an operation control input signal is in a first state, and for electrically connecting the first-mentioned two inverting amplifier circuits when the operation control input signal is in a second state, second switch means for electrically disconnecting between the $N_2$-th inverting amplifier circuit and the ($N_2$+1)-th inverting amplifier circuit when the operation control input signal is in the first state and for electrically connecting the last-mentioned two inverting amplifier circuits when the operation control input signal is in the second state, . . . and m-th (m being three or more) switch means for electrically disconnecting between the $N_m$-th inverting amplifier circuit and the ($N_m$+1)-th inverting amplifier circuit when the operation control input signal is in the first state and for electrically connecting the last-mentioned two inverting amplifier circuits when the operation control input signal is in the second state; and first voltage setting means for setting inputs of the $N_1$-th and ($N_1$+1)-th inverting amplifier circuits at the same voltage when the operation control input signal is in the first state, second voltage setting means for setting inputs of the $N_2$-th and ($N_2$+1)-th inverting amplifier circuits at the same voltage when the operation control input signal is in the first state, . . . and m-th voltage setting means for setting inputs of the $N_m$-th and ($N_m$+1)-th inverting amplifier circuits at the same voltage when the operation control input signal is in the first state.

Thus, the voltage between one of the $N_1$-th to $N_m$-th inverting amplifier circuits and the next inverting amplifier circuit starts at its intermediate level immediately after the corresponding switch has been closed. As a result, the voltage-controlled oscillation circuit can oscillate at a frequency extremely near the frequency that would be obtained when the voltage-controlled oscillation circuit statically oscillated. Even if the oscillation frequency of the voltage-controlled oscillation circuit is lowered, a frequency nearer the stationary oscillation frequency immediately after the start of oscillation can be obtained, so that a voltage-controlled oscillation circuit with a reduced current consumption can be provided.

In the voltage-controlled oscillation circuit of the present invention, at least one of a ratio of an output load capacity of the $N_1$-th inverting amplifier circuit to an input load capacity of the ($N_1$+1)-th inverting amplifier circuit, a ratio of an output load capacity of the $N_2$-th inverting amplifier circuit to an input load capacity of the ($N_2$+1)-th inverting amplifier circuit, . . . and a ratio of an output load capacity of the $N_m$-th inverting amplifier circuit to an input load capacity of the ($N_m$+1)-th inverting amplifier circuit is different from the others.

As the voltage between one of the $N_1$-th to $N_m$-th inverting amplifier circuits and the next inverting amplifier circuit at the start of oscillation is nearer the voltage at the stationary oscillation, the voltage-controlled oscillation circuit can oscillate at a frequency nearer the stationary oscillation frequency immediately after the start of oscillation. It is experientially known that the voltage at the stationary oscillation has an intermediate voltage at one point among three points (when m=3), the intermediate voltage at the one point being necessarily different from those of the other two points. Therefore, two or more intermediate voltages different from one another are required to provide a frequency immediately after the start of oscillation that is nearer the static oscillation frequency.

According to the present invention, the voltage between one of the $N_1$-th to $N_m$-th inverting amplifier circuits and the next inverting amplifier circuit can be started at any different intermediate voltage immediately after the corresponding switch has been closed. Thus, the voltage-controlled oscillation circuit can oscillate at a frequency nearer the stationary oscillation frequency immediately after the start of oscillation.

In the voltage-controlled oscillation circuit of the present invention, the sum of the output load capacity of the $N_1$-th inverting amplifier circuit and the input load capacity of the ($N_1$+1)-th inverting amplifier circuit, the sum of the output load capacity of the $N_2$-th inverting amplifier circuit and the input load capacity of the ($N_2$+1)-th inverting amplifier circuit, . . . and the sum of the output load capacity of the $N_m$-th inverting amplifier circuit and the input load capacity of the ($N_m$+1)-th inverting amplifier circuit are equalized.

Thus, the duty of oscillation can be equalized. It is further desirable that the same load capacity as the output load capacities of the other inverting amplifier circuits is provided at the intermediate point between two inverting amplifier circuits of which are not required switch function.

DETAILED DESCRIPTION OF THE PREFERRED EMBODIMENTS

First Embodiment

Figure 1:
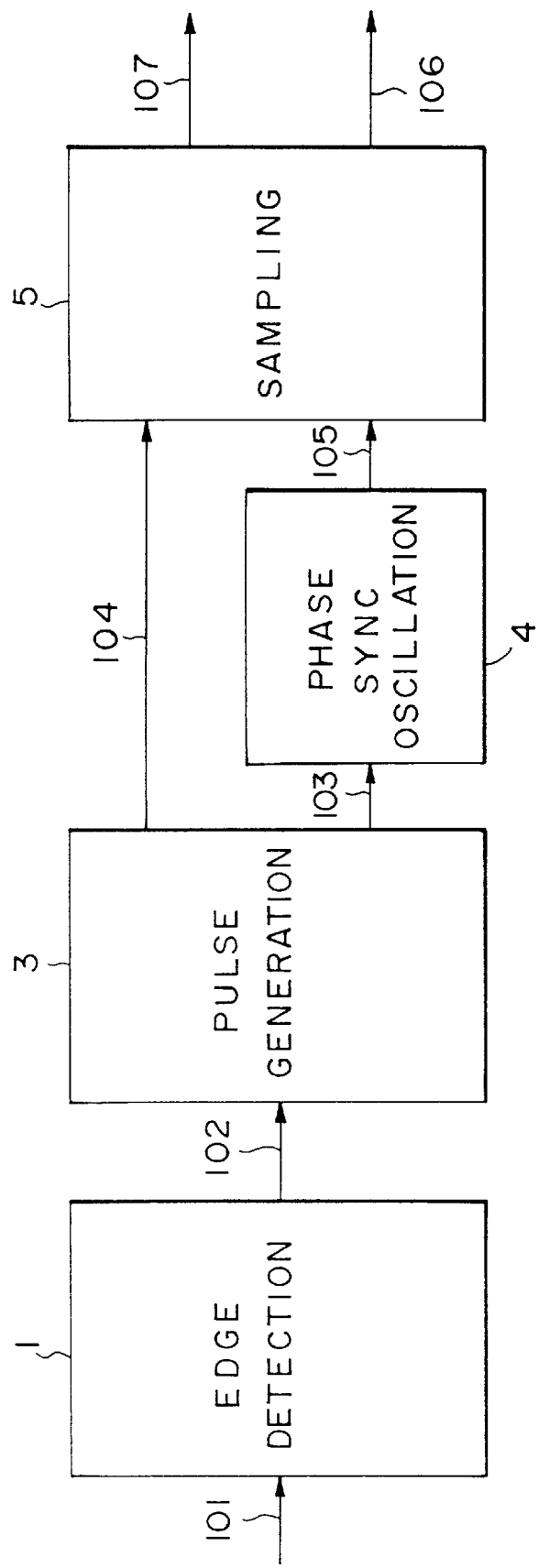
FIG. 1 is a functional block diagram of a first embodiment of a data decoding circuit constructed according to the present invention.
Figure 2:
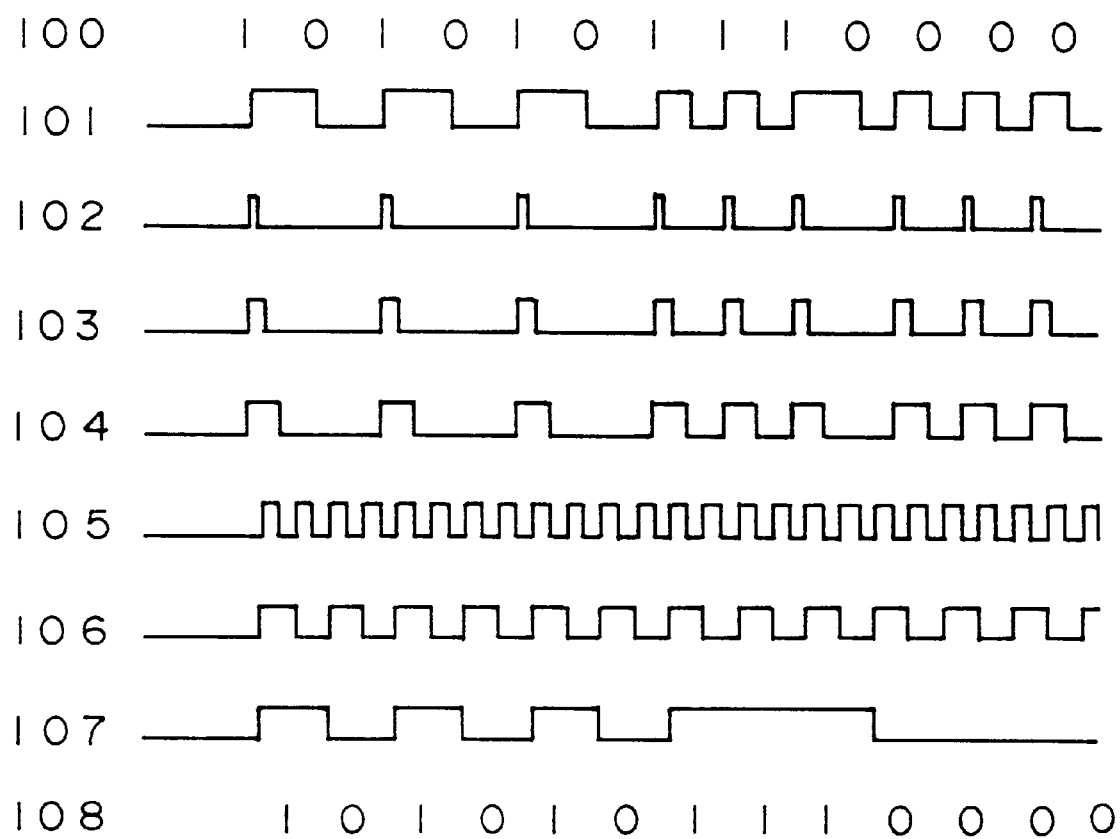
FIG. 2 is a timing chart of the first embodiment of the data decoding circuit.

FIG. 1 is a functional block diagram of the first embodiment of a data decoding circuit constructed in accordance with the present invention while FIG. 2 is a timing chart in the data decoding circuit. Numbers 101–107 in FIG. 2 correspond to the signal lines 101–107 in FIG. 1, respectively. In FIG. 2, a number 100 shows a data to be transferred; 101 a split-phase coded received data; and 108 a decoded data.

The received data 101 is a received signal received by and outputted from a receiving circuit, which will be described, as a digital return-to-zero (RZ) data. The received data 101 originally has a frame synchronization data in which a data represented by "1010 . . . " is used as a frame synchronization signal.

As shown in FIG. 1, the data decoding circuit of the first embodiment comprises an edge detecting section 1, a pulse generating section 3, a phase synchronization oscillating section 4 and a sampling section 5.

The edge detecting section 1 receives the received data 101 and includes a differentiating circuit for detecting a transition point in the received data to sense the leading edge of the received data 101, resulting in generation of an edge detection output signal 102.

The edge detection output signal 102 is inputted to the pulse generating section 3 to trigger it.

The pulse generating section 3 then outputs a received data regenerating signal 104 having a pulse width equal to substantially 1/(2×fs) and a phase comparing timing signal 103 having a pulse width equal to substantially 1/(4×fs) when it is triggered by the leading edge of the edge detection output signal 102.

FIG. 2 shows the edge detection output signal 102 outputted in synchronism with the leading edge of the received data. However, the edge detection output signal 102 may be outputted in synchronism with the trailing edge of the received data. Furthermore, the phase comparing timing signal 103 and received data regenerating signal 104 may be outputted from the pulse generating section 3 in synchronism with either of the leading or trailing edge of the edge detection output signal 102.

The phase difference between the phase comparing timing signal 103 or the received data regenerating signal 104 and the edge detection output signal 102 is not limited to that of FIG. 2. It is important that when the phase comparing timing signal having a pulse width substantially equal to 1/(4×fs) and the received data regenerating signal having a pulse width substantially equal to 1/(2×fs) are generated in synchronism with the edge detection output, the leading or trailing edge of the phase comparing timing signal 103 having a pulse width substantially equal to 1/(4×fs) corresponds to the central area of the substantially 1/(2×fs) pulse width of the received data regenerating signal 104.

The phase synchronization oscillating section 4 oscillates with a frequency two times a data transfer frequency fs in phase synchronization with the phase comparing timing signal 103. A phase synchronization signal 105 shown in FIG. 2 shows an oscillation frequency at 2×fs (n=1). As shown in FIG. 2, the phase synchronization signal 105 is oscillated in synchronism with the edge detection output signal 102 form the phase synconization section 4. This provides an advantage that when there is no received data (non-data-received state), the phase synchronization oscillating section 4 can be made inoperative to reduce the current consumption. Another advantage can be provided that when there is no data, a frame synchronization circuit, which will be described later, in the sampling section 5 can be easily initialized with a bit synchronization signal being easily formed.

When there is a received data (data-received state), this embodiment can provide the phase synchronization signal 105 in synchronism with the phase comparing timing signal 103. When there is no received data, therefore, the phase synchronization signal 105 may continuously oscillate. However, it is required that the sampling section 5 is controlled in synchronism with the change from the non-data-received state to the data-received state.

The sampling section 5 outputs a signal obtained by dividing a frequency of the phase synchronization signal 105 into 1/(2×n) as a bit synchronization signal 106. The bit synchronization signal 106 is used to sample the received data regenerating signal 104 which is the output of the pulse generating section 3. The sampled signal is then outputted as a non-return-to-zero (NRZ) serial binary data 107.

This embodiment can make the synchronization of bit even if the same codes are continuously inputted into the data decoding circuit since the phase comparing timing signal 103 is generated from a transition point in the received data 101 and the received data 101 of split-phase code has a frequency component equal to at least one-half the data transfer frequency fs.

This embodiment can exactly decode a received data 101 having a jitter within a range of ±1/(4×fs) since the received data regenerating signal 104 having a pulse width substantially equal to 1/(2×fs) is sampled by the bit synchronization signal 106 in synchronism with the phase comparing timing signal 103 having a pulse width substantially equal to 1/(4×fs). This embodiment can further provide an advantage that the comparator used in the receiving circuit is not required a high precision since the received data regenerating signal 104 having a pulse width substantially equal to 1/(2×fs) is generated from the received data 101 and sampled by the bit synchronization signal 106 to transform the received signal into a digital signal. The precision of the comparator may be required for a response speed, frequency characteristic, a threshold voltage when the received signal is transformed into the digital value or the like.

Second Embodiment

Figure 3:
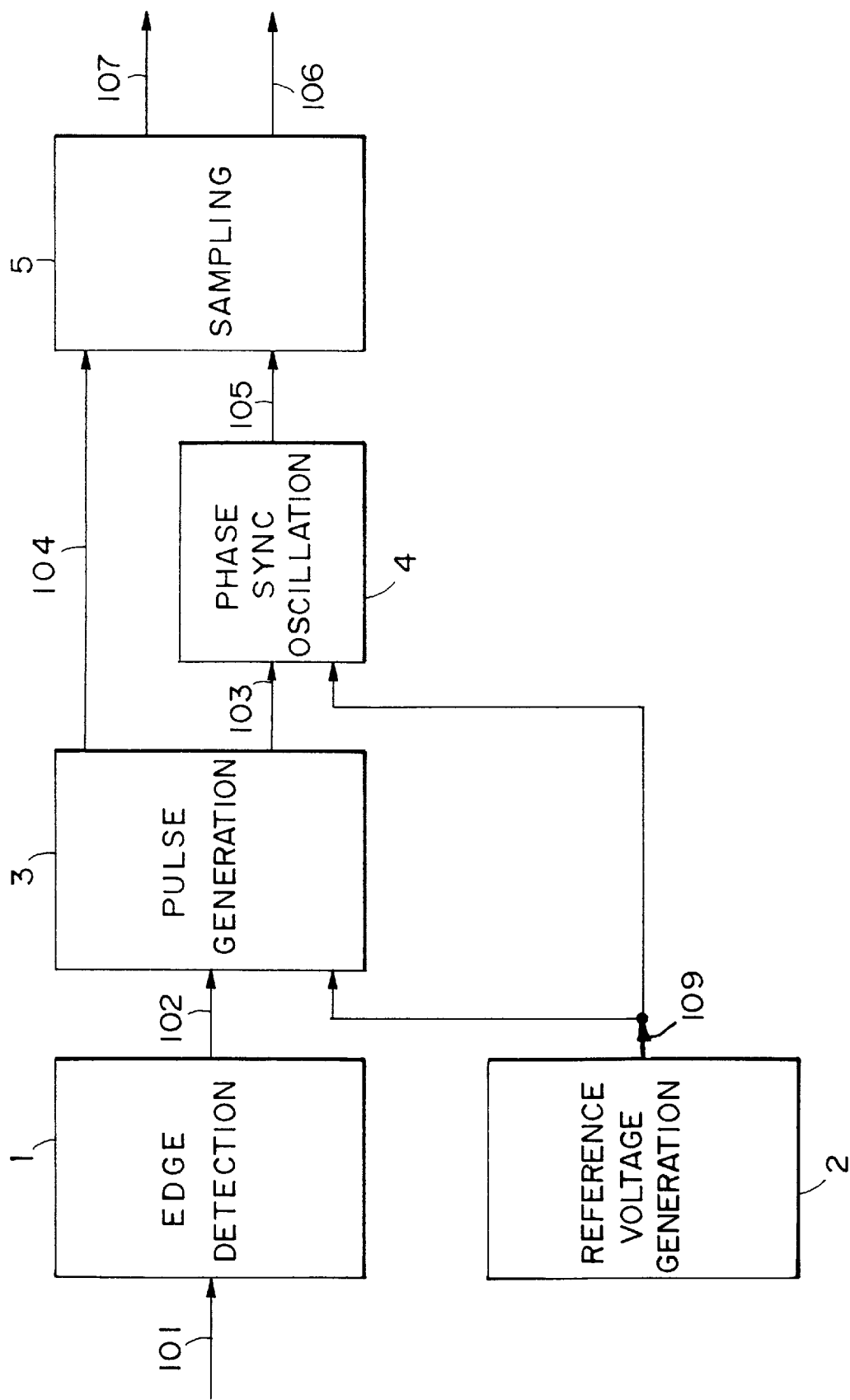
FIG. 3 is a functional block diagram of a second embodiment of a data decoding circuit constructed according to the present invention.

FIG. 3 is a functional block diagram of the second embodiment of a data decoding circuit constructed in accordance with the present invention. In FIG. 3, functional blocks similar to those of FIG. 1 are denoted by similar reference numerals. The data decoding circuit of the second embodiment includes a function described in generating an exact time axis in addition to the functions of the first embodiment.

A reference voltage generating section 2 includes a first voltage control oscillator (VC0) which oscillates with a frequency 2×n times the data transfer frequency fs to output a reference voltage 109. The first VCO has a function capable of controlling the start and stop of oscillation in response to an operation control input signal (which function will be referred to "restart function") and is controlled such that the first VCO is always oscillating in an operation state.

Figure 22:
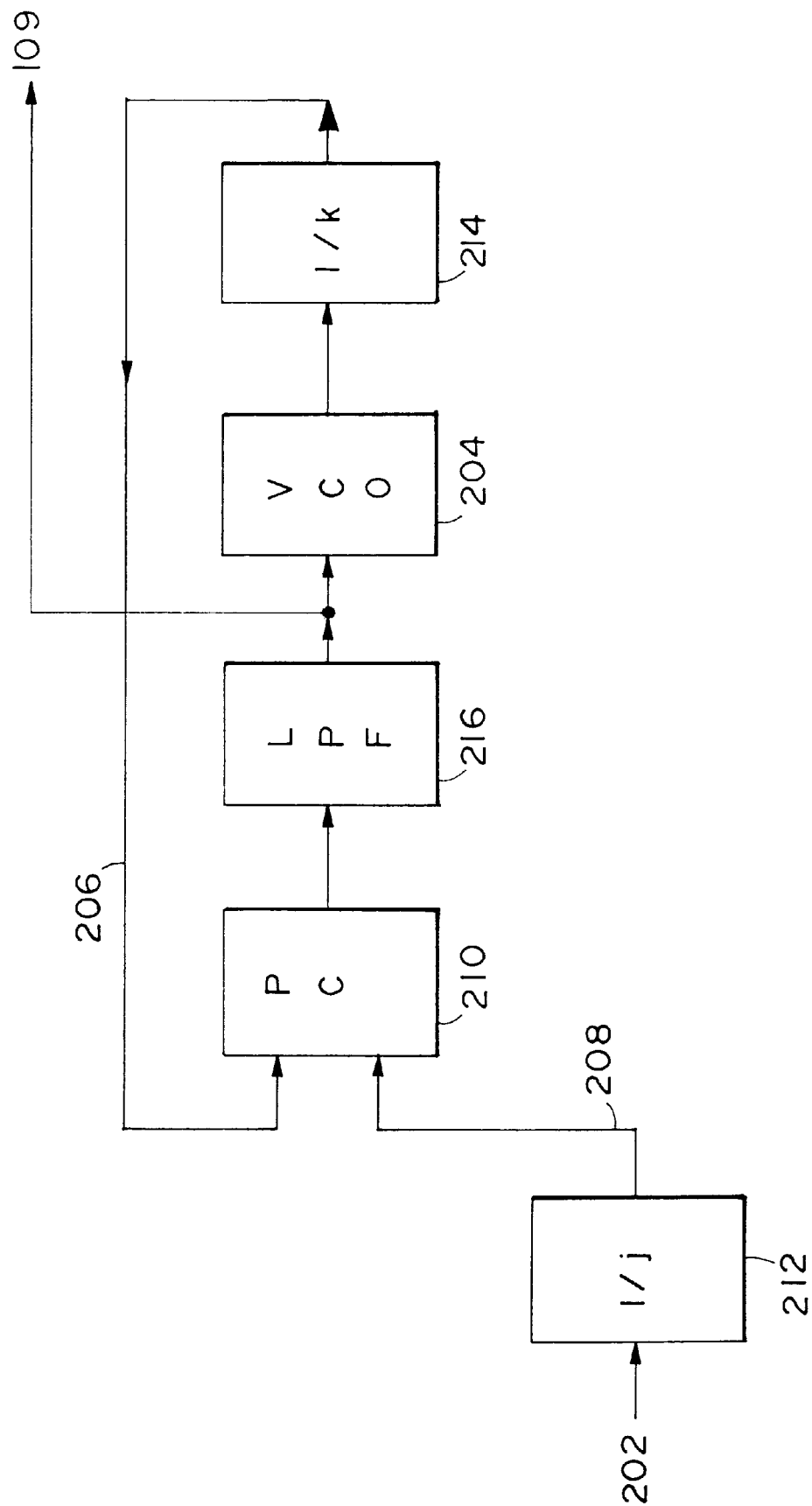
FIG. 22 is a circuit usable in a reference voltage generating section.

FIG. 22 shows a circuit usable in the reference voltage generating section 2. This circuit includes frequency dividers 212 and 214, a phase comparator 210, a low-pass filter 216 and a first VCO 204, all of which together form a general phase-locked loop (PLL). Reference numeral 202 designates an extremelly supplied reference clock signal having a frequency which is m times the data transfer frequency fs. The phase comparator 210 compares a signal 206 provided by dividing the output of the first VCO 204 into 1/k with a signal 208 provided by dividing the reference clock signal 202 into 1/j to adjust the control voltage for the first VCO (2×n×j=m×k).

The reference voltage generating section 2 makes the first VCO 204 oscillate with the frequency which is 2×n times the data transfer frequency fs as described. The reference voltage generating section 2 then outputs a voltage depending on the control voltage (or the control voltage itself) as a reference voltage 109.

The pulse generating section 3 includes a second VCO and generates two different signals, namely, a phase comparing timing signal 103 having a pulse width substantially equal to 1/(4×fs) and a received data regenerating signal 104 having a pulse width substantially equal to 1/(2×fs).

The phase synchronization oscillating section 4 includes a third VCO and has a function of oscillating with a frequency 2×n times the data transfer frequency fs in phase synchronization with the phase comparing timing signal 103.

The second and third VCO's of the pulse generating and phase synchronization oscillating sections 3, 4 are of the same structure as that of the first VCO and thus have the same restart function. The reference voltage 109 depending on the control voltage in the first VCO is used in the second and third VCO's as a control voltage.

Since the reference voltage 109 is equal to the control voltage of the second VCO in the pulse generating section 3, the output of the second VCO with the restart function will be oscillated with a frequency which is 2×n times the data transfer frequency fs. Thus, a signal having a pulse width improved in precision can be easily generated by dividing the oscillation output.

Since the reference voltage 109 is equal to the control voltage of the third VCO in the phase synchronization oscillating section 4, the frequency of the phase synchronization signal 105 is basically equal to 2×n times the data transfer frequency fs. Therefore, the bit synchronization can be quickly realized simply by adjusting the phase of the phase synchronization timing signal 103.

The sampling circuit 5 outputs a signal obtained by dividing the phase synchronization signal 105 into 1/(2×n) as a bit synchronization signal 106. The bit synchronization signal 106 is then used to sample the received data regenerating signal 104 which is the output of the pulse generating section, thereby outputting a NRZ serial binary data 107.

Third Embodiment

Figure 4:
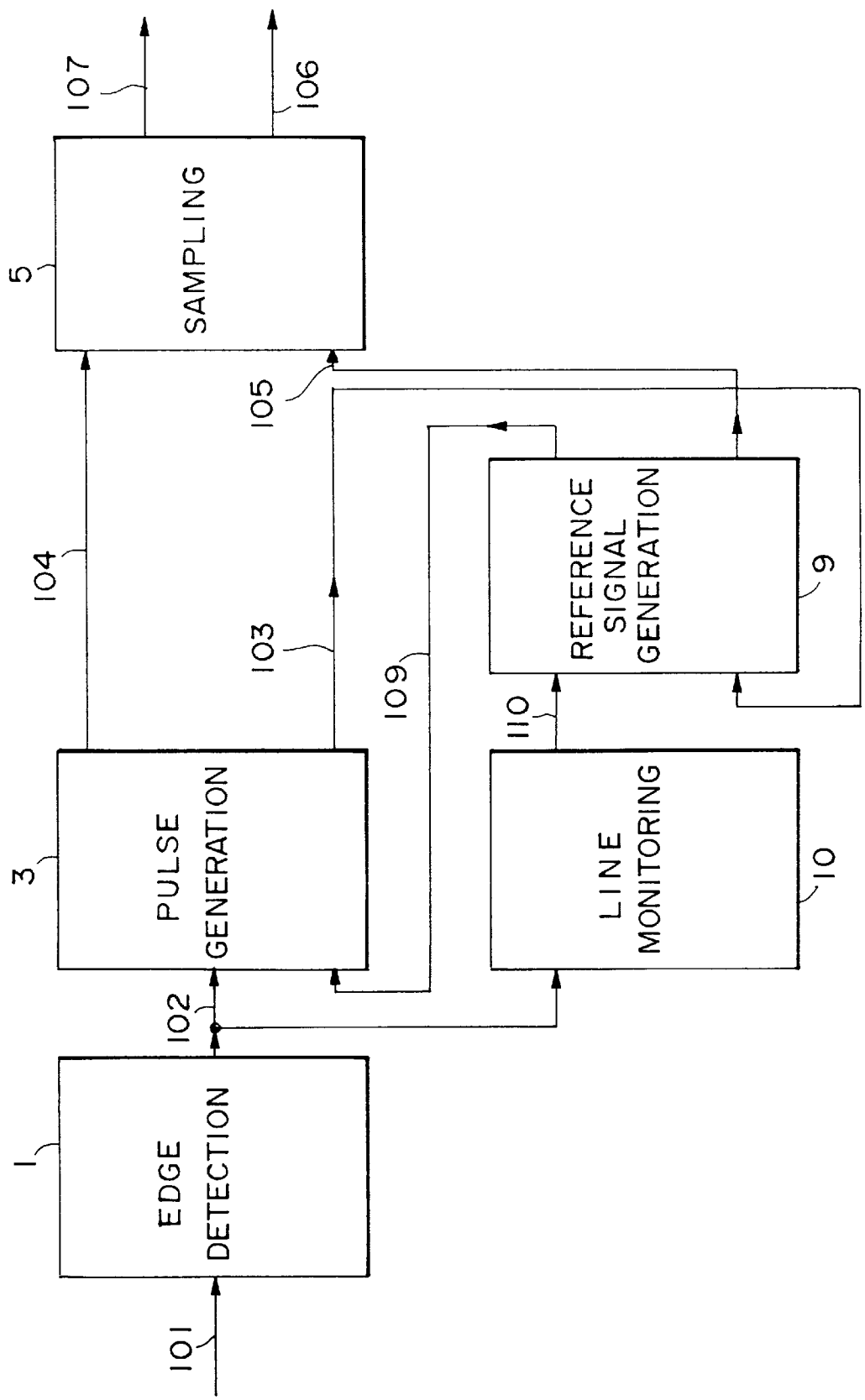
FIG. 4 is a functional block diagram of a third embodiment of a data decoding circuit constructed according to the present invention.

FIG. 4 is a functional block diagram of the third embodiment of a data decoding circuit constructed in accordance with the present invention. In FIG. 4, functional block similar to those of FIG. 1 are denoted by similar reference numerals. The third embodiment is intended to provide a circuit scale smaller than that of the second embodiment.

A data decoding circuit according to the third embodiment comprises a line monitoring section 10 for detecting non-signal-received and signal-received states and a reference signal generating section 9 having a function of oscillating with a frequency 2×n times the data transfer frequency fs in synchronism with the received data 101, in place of the reference signal generating section 2 and phase synchronization oscillating section 4 of the second embodiment.

The edge detection output signal 102 being the output of the edge detecting section 1 is inputted into both the pulse generating section 3 as in the previous embodiments and also inputted into line monitoring section 10. The output 110 of the line monitoring section 10 is inputted into the reference signal generating section 9.

The reference signal generating section 9 includes means for oscillating the first VCO with a frequency 2×n times the data transfer frequency fs when the output of the line monitoring section 10 indicates the non-signal-received state. The reference signal generating section 9 also includes means for oscillating the first VCO with a frequency 2×n times the data transfer frequency fs in synchronism with the phase comparing timing signal 103 when the output of the line monitoring section 10 indicates the signal-received state. The phase synchronization signal 105 being the oscillating output of the reference signal generating section 9 is inputted into the sampling section 5. The reference signal generating section 9, also outputs the reference voltage 109 of the VCO in the pulse generating section 3.

In such an arrangement, the use of two VCO's can provide the same function and characteristic as those of the second embodiment.

Figure 5:
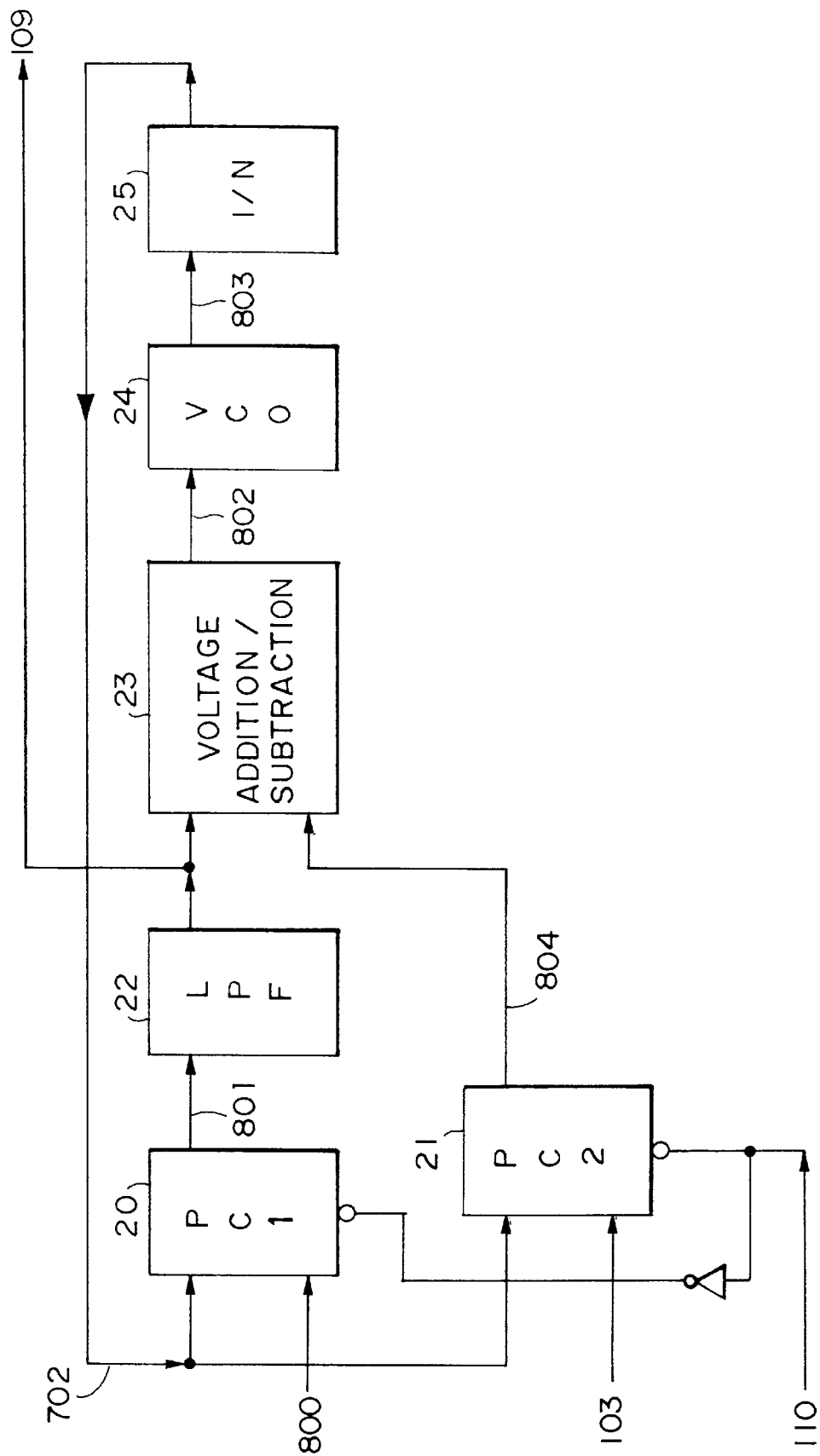
FIG. 5 is a functional block diagram of a reference signal generating section.

FIG. 5 shows a circuit usable in the reference signal generating section 9. Such a circuit comprises phase comparators 20 and 21, a low-pass filter 22, a voltage adding/subtracting section 23, a VCO 204 and a frequency divider 25. The VCO 204 is a first VCO having the restart function. Reference numeral 800 denotes a signal having a frequency two times the data transfer frequency fs and 103 designates a phase synchronization timing signal in the pulse generating section. The phase comparator 20 operates during the non-signal-received state and stops during the signal-received state while the phase comparator 21 is actuated in the inversive manner. Thus, delay/advance signals 801 and 804 are respectively outputted from the phase comparators 20 and 21 such that the signals 800 and 103 are placed in phase synchronization.

When the output signal 110 of the line monitoring section 10 is in the non-signal-received state ("L" voltage), the VCO 24 will not be prevented from oscillating in synchronism with the input 800 since the phase comparator 21 is inoperative. On the other hand, the phase comparator 20 operates to output the delay/advance signal 801 such that the phase of the divided output 702 of the VCO 24 will be locked with that of the signal 800 having a frequency two times the data transfer frequency fs. In the non-signal-received state, thus, the VCO 24 will oscillate with a frequency two times the data transfer frequency fs.

The output voltage 109 of the low-pass filter (LPF) 22 corresponds to the output voltage 109 of the reference voltage generating section in the second embodiment. In the non-signal-received state, the output 802 of the voltage adding/subtracting section 23 becomes equal in voltage to the output 109 of the LPF.

Under the non-signal-received state, thus, the general PLL is formed by the phase comparator 20, the low-pass filter 22, the VCO 24 controlled in oscillation frequency by the output voltage of the low-pass filter 22 and the frequency divider 25 for dividing the output 803 of the VCO 24 into 1/n.

When the output signal 110 of the line monitoring section is in the signal-received state ("H" voltage), the phase comparator 20 stops operation while the output 109 of the LPF 22 is maintained at a voltage for the non-signal-received state. On the other hand, the phase comparator 21 operates to output the delay/advance signal 804 such that the phase of the divided output 702 from the VCO 24 is locked with the phase of the phase comparing timing signal 103 from the pulse generating section. The voltage adding/subtracting section 23 performs the addition or subtraction the voltage according to the delay/advance signal 804 relative to the output voltage of the LPF 22. Thus, the VCO 24 can oscillate with a frequency 2×n times the data transfer frequency fs in synchronism with the phase comparing timing signal 103.

Figure 6:
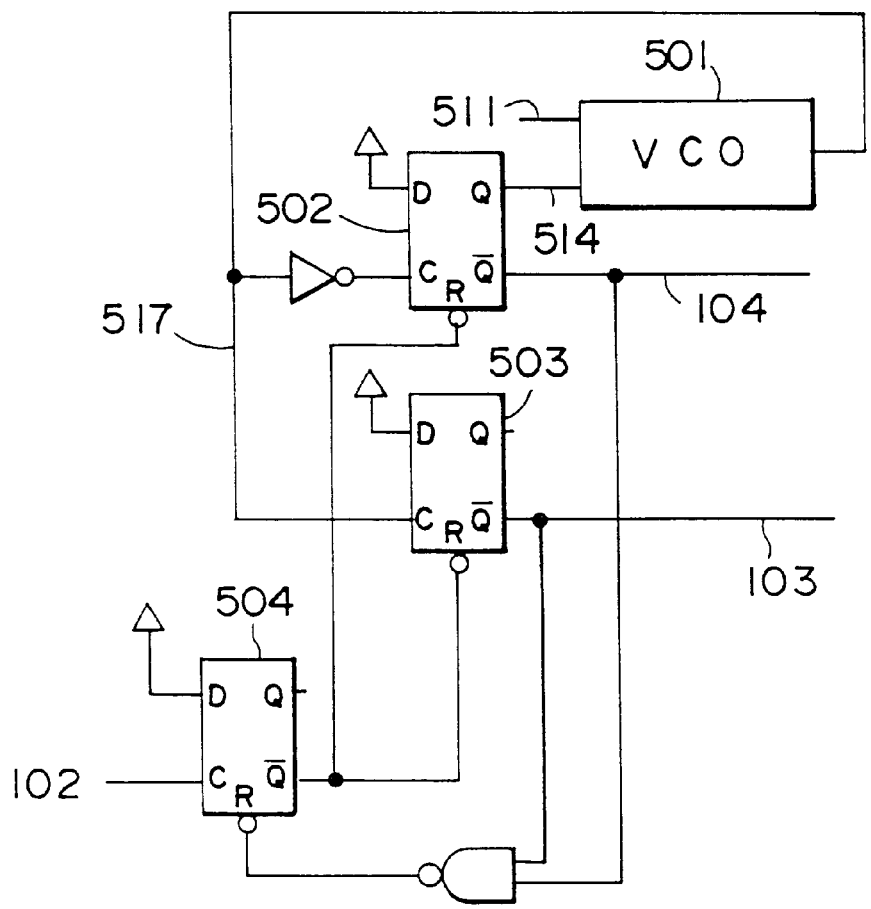
FIG. 6 is a circuit diagram of a pulse generating section.
Figure 7:
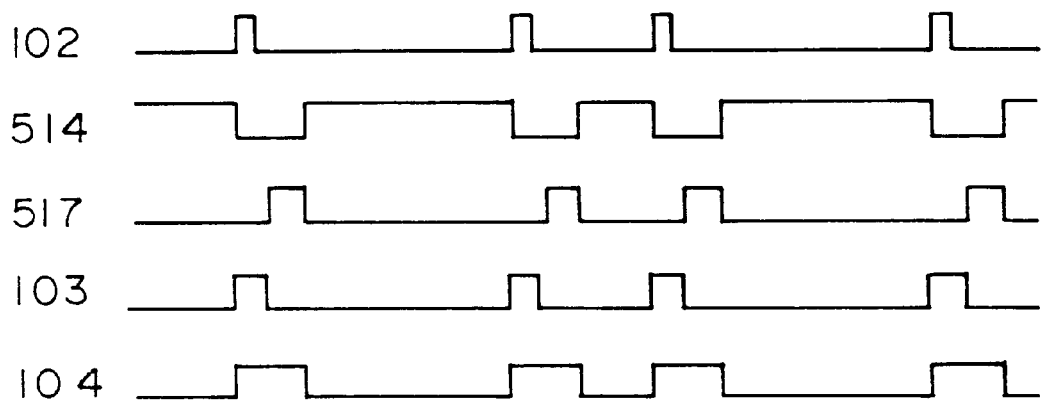
FIG. 7 is a timing chart of the circuit of FIG. 6.

FIG. 6 shows a circuit usable in the pulse generating section 3. The circuit may be used in place of the pulse generating section 3 in the data decoding circuit of the first or second embodiment. FIG. 7 is a timing chart illustrating the respective signals in FIG. 6. The pulse generating section 3 includes a VCO 501 having a restart function and resetable flip flops (FF) 502–504. The pulse generating section 3 receives the edge detection output signal 102. The input 511 of the VCO 501 is connected to the reference voltage 109 which is in turn used as an oscillation frequency control voltage in the VCO 501. The input 514 of the VCO 501 is a restart control signal used to control the operation of the VCO 501.

The circuit is initiated when the restart control signal becomes "L" voltage. Assuming that the output of the inoperative VCO 501 is in "L" voltage, the operation of the circuit will be described. The data inversion output of the FF 504 is made "L" by the leading edge of the edge detection output signal 102 while the other FF's 502 and 503 are reset. When the reset of the FF's 502 and 503 is detected, the FF 504 is reset.

When the FF 502 is reset, the restart signal 514 of the VCO 501 becomes "L". The oscillation of the VCO 501 is initiated by the reference voltage 109 connected to the input 511 thereof which is used as a control voltage. The VCO output 517 rises with a delay one-half the cycle of the oscillation frequency and shifts to "L" voltage after "H" section one-half the cycle.

The phase synchronization timing signal 103 is shifted to "L" voltage by the leading edge of the VCO output 517. The output 104 of the FF 502 is changed to "L" voltage by the trailing edge of the VCO output 517. In such a manner, the received data regenerating signal 104 having a pulse width substantially equal to 1/(2×fs) and the phase comparing timing signal 103 having a pulse width substantially equal to 1/(4×fs) are generated.

FIG. 6 shows the circuit when the oscillation frequency of the VCO is two times the data transfer frequency fs, but the same function can be provided by dividing the VCO output into 1/n even if the oscillation frequency is 2×n times the data transfer frequency fs.

Figure 8:
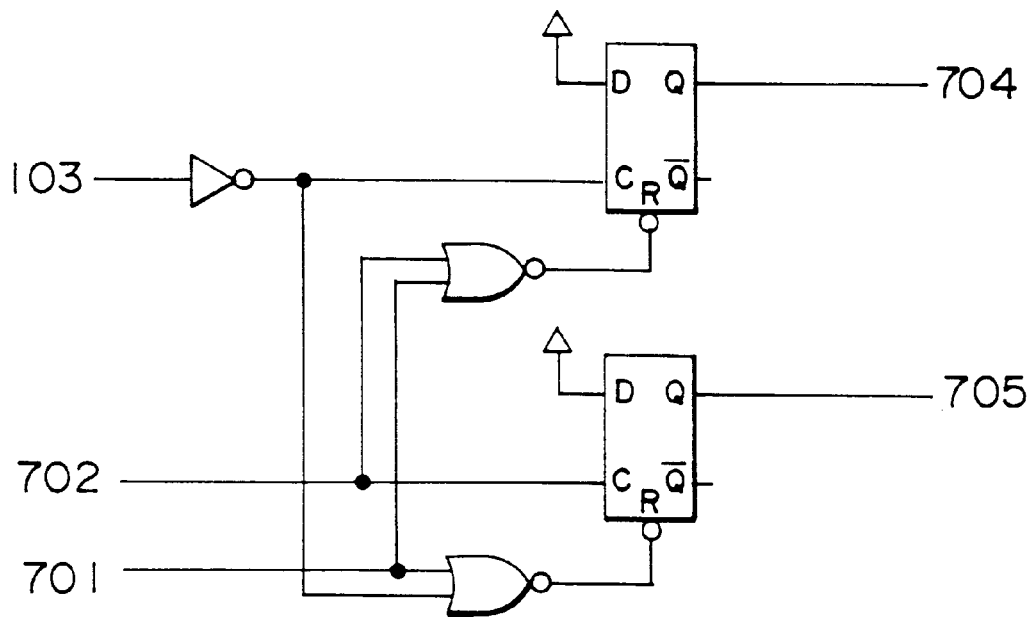
FIG. 8 is a circuit diagram of a phase comparator.
Figure 9:
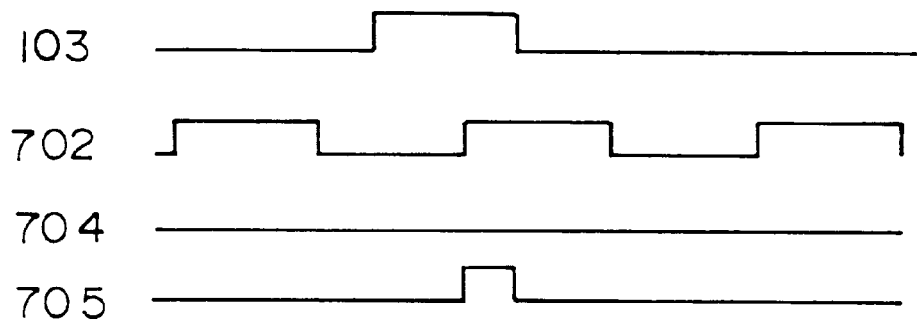
FIG. 9 is a timing chart of the circuit of FIG. 8 when the phase is delayed.
Figure 10:
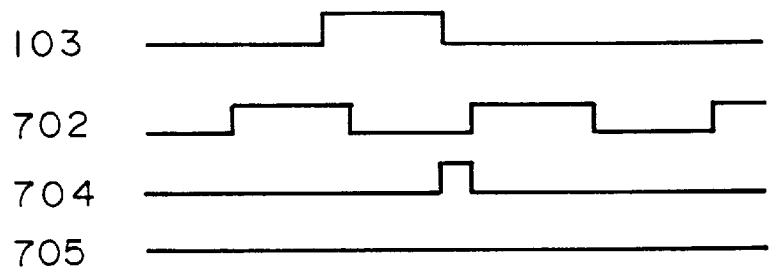
FIG. 10 is a timing chart of the circuit of FIG. 8 when the phase is advanced.

FIG. 8 shows a circuit usable as a phase comparator (21 in FIG. 5) for the phase comparing timing signal 103 in the reference voltage generating section 2 of the third embodiment. This circuit may be used in place of the phase comparator in the phase synchronization oscillating section 4 of the first or second embodiment or in place of the phase comparator (210 in FIG. 21) in the reference voltage generating section 2 of the second embodiment. FIGS. 9 and 10 show timing charts in the phase comparator of FIG. 8.

An input signal 701 is a control signal determining whether or not the phase comparator should be operated. In the operative state, the control signal is fixed to "L" voltage. An input signal 103 is a phase comparing timing signal generated by the pulse generating section 3 and having a pulse width substantially equal to 1/(4×fs). An input signal 702 is a signal obtained by dividing the VCO output into 1/n and has a frequency of 2×fs.

This circuit performs a phase lock by matching the trailing edge of the phase comparing timing signal 103 with the leading edge of the input 702.

705 is a signal used to delay the VCO phase when the phase of the divided output 702 of the VCO advances from the phase of the phase comparing timing signal 103. FIG. 9 is a timing chart illustrating the circuit of FIG. 8 when the phase of the divided output 702 of the VCO advances from the phase of the phase comparing timing signal 103.

704 is a signal for advancing the VCO phase when the phase of the divided output 702 of the VCO is delayed from the phase of the phase comparing timing signal 103. FIG. 10 is a timing chart illustrating the circuit of FIG. 8 when the phase of the divided output 702 of the VCO is delayed from the phase of the phase comparing timing signal 103.

Fourth Embodiment

Figure 11:
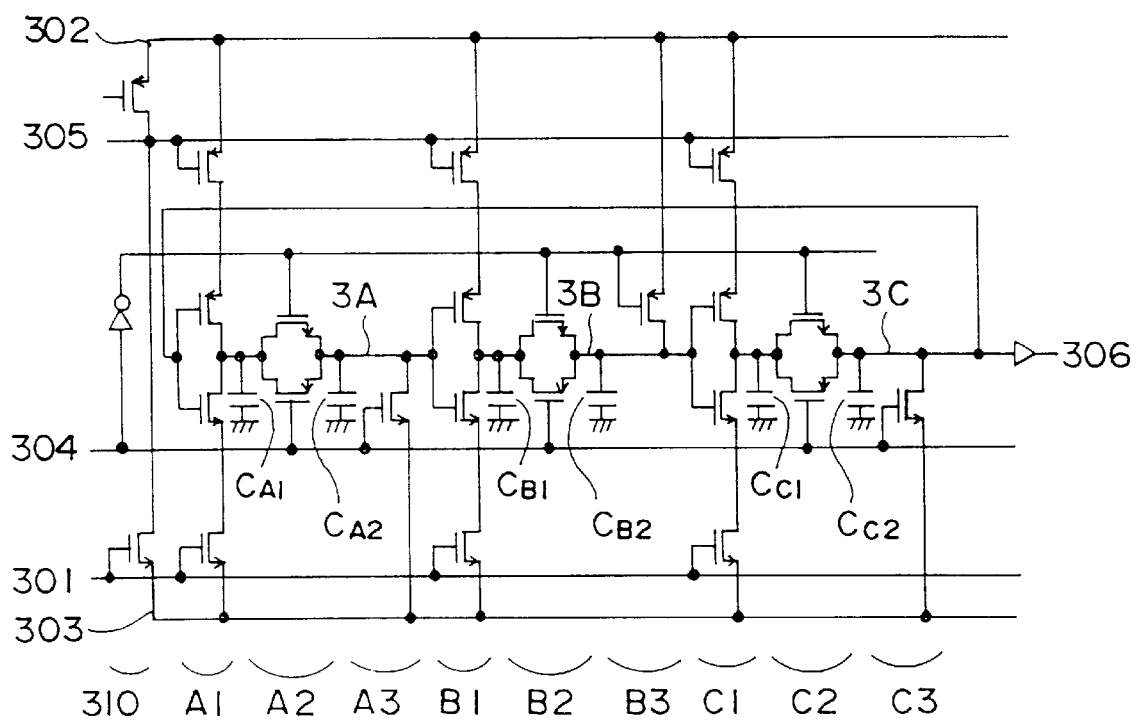
FIG. 11 is a circuit diagram of VCO with a restart function according to the prior art.

FIG. 11 shows a circuit of a VCO having a restart function which is constructed according to the prior art. An input 304 is a restart control signal for initiating the oscillation with "L" voltage. The restart control signal 304 stops the oscillation at "H" voltage. An output 306 is fixed to "L" voltage. 301 is an oscillation control voltage input.

In FIG. 11, A1, B1 and C1 are current-controlled inverting amplifier circuits. Each of the inverting amplifier circuits includes a constant-current type field-effect transistor on the low voltage side, the gate electrodes thereof being connected to each other and connected to an input voltage 301 for controlling the oscillation frequency. The inverting amplifier circuit also includes a constant-current type transistor on the high voltage side, the gates being connected to a voltage 305 shifted in voltage at 310.

A2, B2 or C2 is a switch for connecting/disconnecting between the output of the corresponding inverting amplifier circuit and the input of the next inverting amplifier circuit according to the restart control signal 304. Each of A3, B3 and C3 is a switch for preventing the input of the corresponding inverting amplifier circuit from being floated when the corresponding switch A2, B2 or C2 is in its OFF state.

Figure 12:
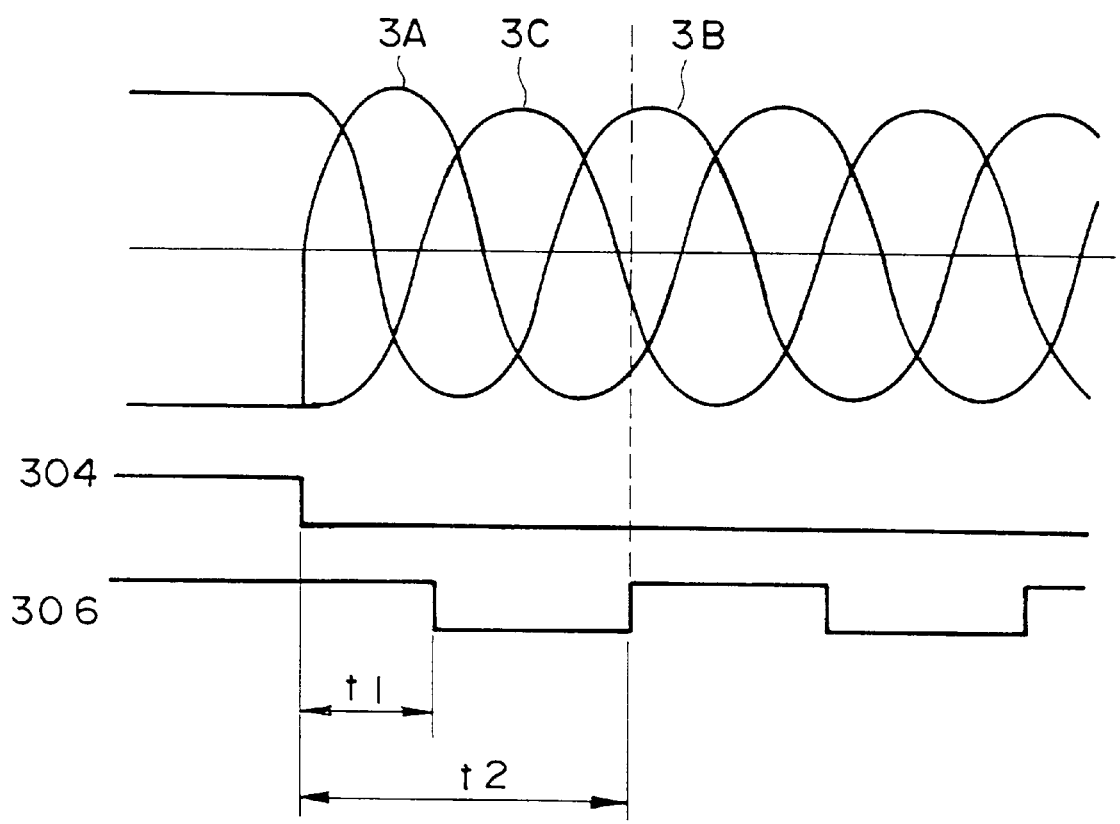
FIG. 12 is a timing chart of the circuit shown in FIG. 11.

FIG. 12 is a timing chart illustrating the VCO of FIG. 11.

When the restart control signal 304 is at "H" voltage, points 3A, 3B and 3C in FIG. 11 are fixed to "L", "H" and "L" respectively. An output 306 is fixed to "L" voltage.

Immediately before the restart control signal 304 becomes "L" voltage, the voltages at each of the points 3B and 3C become equal to the output voltage from the previous-stage inverting amplifier circuit. Thus, the voltages at the point 3B and 3C are respectively "H" and "L" voltages immediately after the restart control signal 304 has been "L" voltage.

The voltage at the point 3A is divided into such an intermediate voltage as shown in FIG. 12 according to the ratio of capacity of the opposite ends of the switch when the switch A2 is closed (on state). This is because the voltages at the opposite ends of the switch A2 are different from each other when the switch is opened (off state). The capacities of the switch at the opposite ends are determined by a parasitic capacity such as transistor drain or gate capacity, a capacity intentionally added for regulating the relationship between the frequency and the control voltage in the VCO or the like.

Immediately after the oscillation has been initiated, the frequency of the output 306 becomes higher than that of the static oscillation. This is because the ability of the transistor is increased to reduce the impedance and to accelerate the transition of output since the gate voltage is fixed to "H" or "L" at the start. As will be apparent from the output 306 of the VCO in FIG. 12, time t1 required to make the output "L" after the start of oscillation is smaller than t2.

When a signal oscillated with a frequency 2×n times the data transfer frequency fs is divided to generate a pulse of substantially 1/(4×fs) or 1/(2×fs), larger "n" will provide less affection due to the deviation in the oscillation frequency at the start of oscillation, resulting in increase of the precision. However, higher oscillation frequency will increase the current consumption and also the noise.

Figure 13:
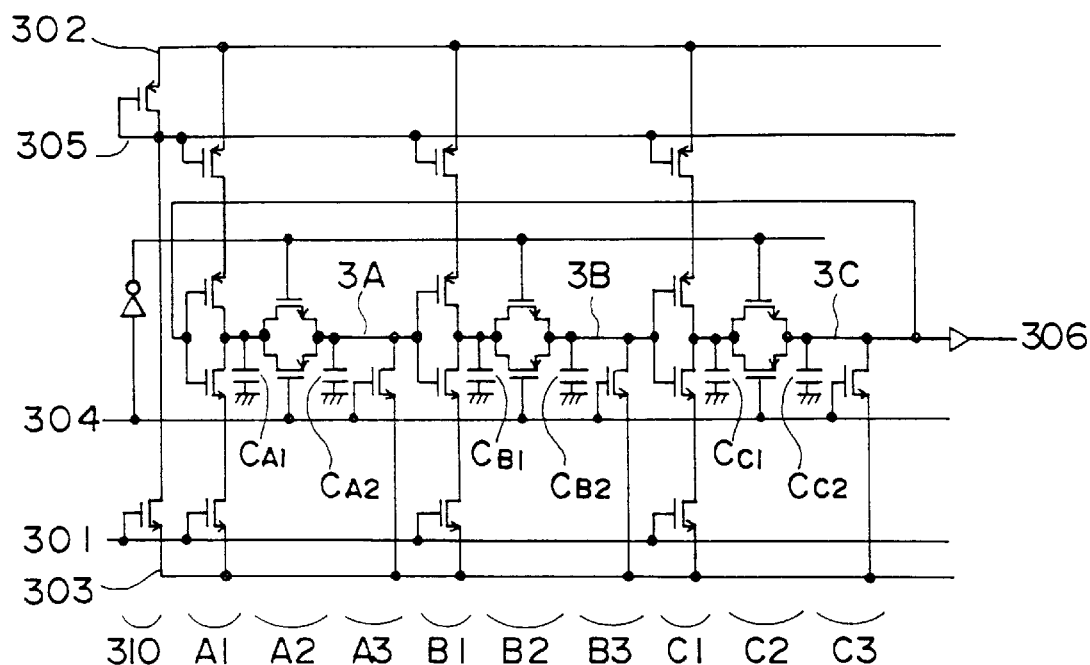
FIG. 13 is a circuit diagram of a voltage-controlled oscillation circuit in a fourth embodiment of the present invention.

FIG. 13 is a circuit diagram of the VCO according to the fourth embodiment. The VCO of the fourth embodiment can oscillate with an improved precision from immediately after the restart. FIG. 13 is different from FIG. 12 in that when the restart control signal is at "H" voltage, the input of the third-stage inverting amplifier circuit is inverse to the output voltage of the second-stage inverting amplifier circuit.

Figure 15:
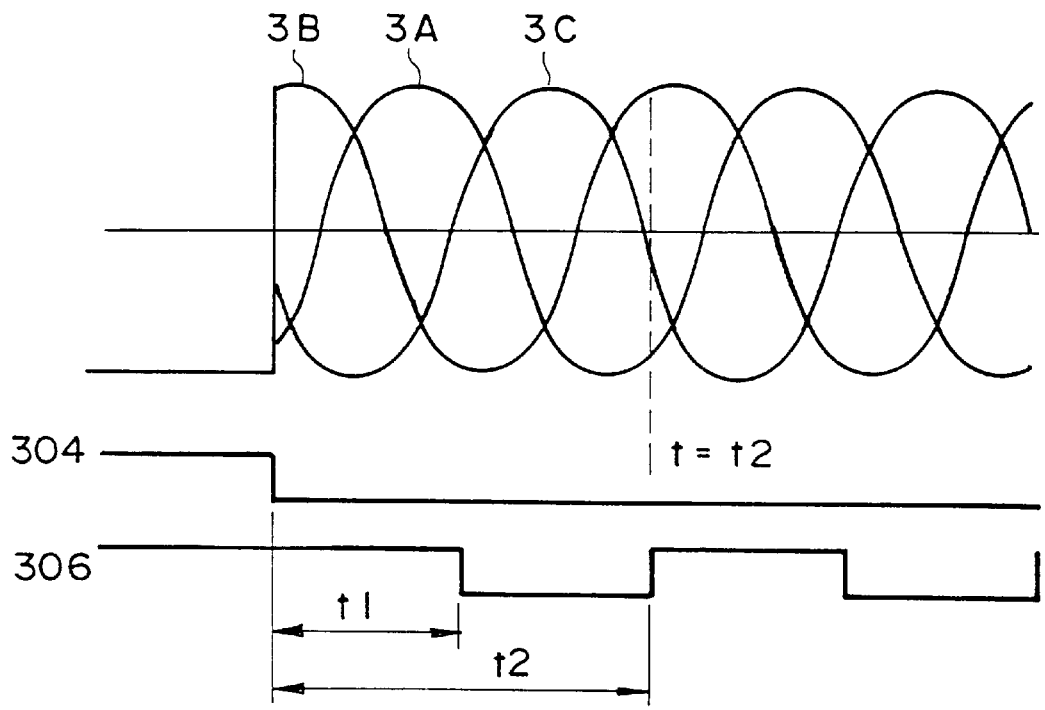
FIG. 15 is a timing chart of the circuit shown in FIG. 13.

FIG. 15 is a timing chart of the circuit shown in FIG. 13. FIG. 15 is different from FIG. 12 in that the points 3A, 3B and 3C are started at the intermediate voltages immediately after the oscillation has been initiated by the restart signal of "L". Moreover, the intermediate voltages of the points 3A and 3C at the start of oscillation are different from each other. This becomes possible when each of the switches A2 and C2 has different off-voltages at the opposite ends as well as different ratios of capacities of the opposite ends.

It will also be apparent from FIG. 15 that the voltages at the points 3A, 3B and 3C on the start of oscillation are near a voltage which can be taken at the static oscillation time (t=t2). As a result, the data decoding circuit can oscillate with a frequency very near that when it continues to statically oscillate from the start of oscillation.

Fifth Embodiment

Figure 14:
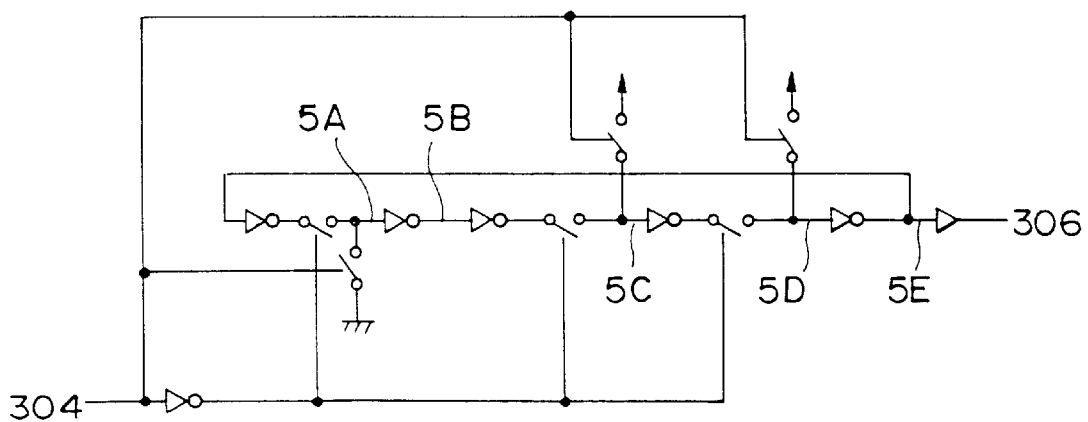
FIG. 14 is a circuit diagram of a voltage-controlled oscillation circuit in a fifth embodiment of the present invention.
Figure 16:
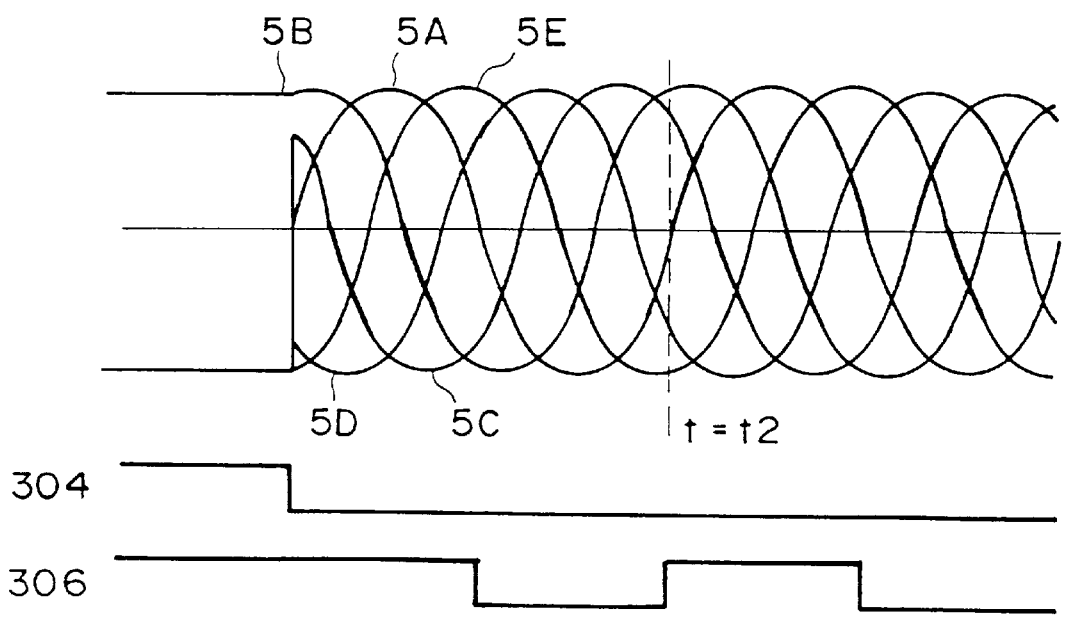
FIG. 16 is a timing chart of the circuit shown in FIG. 14.

FIG. 14 is a circuit diagram of the VCO according to the fifth embodiment while FIG. 16 is a timing chart in the circuit of FIG. 14.

As shown in FIG. 14, the VCO is a voltage-controlled oscillating circuit formed by five inverting amplifier circuits. For simplification, the respective inverting amplifier circuits are simply represented in the form of NOT circuit inverter.

In FIG. 14, when the restart signal is at "H" voltage, there exist three points in each of which a switch located between the input and output of the respective inverting amplifier circuit has different voltages at the opposite ends thereof. Thus, points 5A, 5C and 5D can take different intermediate voltages immediately after the oscillation has been initiated by the restart signal 304 of "L" as shown in FIG. 16. Therefore, the oscillation can be initiated with a voltage which can be taken by each of the points 5A, 5B, 5C, 5D and 5E at a time (t=t2) during the static oscillation. The VCO can oscillate with a frequency near the static oscillation frequency from the beginning. The voltages at the points 5A, 5C and 5D on the start of oscillation are made different from one another in the same manner as described in connection with the VCO of FIG. 13.

To oscillate the VCO with a frequency near the static oscillation frequency from immediately after the start of oscillation, it is preferred that the aforementioned three points are placed under the following condition during the static oscillation. Depending on the input logic level of a buffer generating an output 306, two of the three points can provide the same voltage while the other point has a different voltage, like the voltages at the points 3A, 3B and 3C at time t=3 in FIG. 15.

Since one of the three points necessarily has its intermediate voltage which is different from those of the other points, two or more different intermediate voltages are necessarily required to approach the frequency immediately after the start of oscillation to the static oscillation frequency. This can be accomplished by providing at least one different ratio of capacity of the opposite ends in the intermediate voltage point.

Although this embodiment has been described as to the inverting amplifier circuits each of which is in the form of a constant-current type NOT circuit inventer, the same advantage can be provided by any other circuit having a function of inverting and amplifying an input signal.

To equalize the duty of oscillation, it is preferred that the output capacities of all the inverting amplifier circuits are equal to one another in the oscillation state. More particularly, the duty of oscillation can be equalized by equalizing the sums of the parasitic capacities in the respective switches A2, B2 and C2 at the opposite ends as shown in FIG. 13. It is also desirable that a normally closed switch is located on a point not requiring a switching function (e.g. 5B or 5E in FIG. 14). This is because that point 5B or 5E is caused to have the same load capacity as the output load capacities of the other inverting amplifier circuits in the oscillation state.

The present invention is mainly intended to provide the oscillation frequency of the VCO substantially equal to the static oscillation frequency on the start of oscillation, it may be applied to an adjustment of timing immediately after the oscillation is initiated because the initial voltage on the start of oscillation is variable depending on the ratio of capacity the opposite ends in a switch of.

The VCO of the present invention can be used in place of the VCO's in the data decoding circuits of the first to third embodiments. In such a case, the oscillation frequency can be provided with an improved precision immediately after the VCO having a restart function has been oscillated in the pulse generating section. Therefore, the time axes of the received data regenerating and phase comparing timing signals 104, 103 can be made more exact, resulting in increase of the jitter margin in the received data.

Since the oscillation frequency can be improved in precision from the start of oscillation, the received data regenerating and phase comparing timing signals 104, 103 can be provided with an improved precision even if the oscillation frequency of the VCO used as a reference level when the VCO is oscillated with a frequency 2×n times the data transfer frequency fs is lowered. Thus, "n" can be set at one (1). This can very reduce the current consumption in the whole data decoding circuit. The reduction of the current consumption provides an advantage that the source noise is reduced to depress the analogous degradation in a receiving section such as a comparator for transforming a transferred signal into a digital data. Furthermore, the VCO of the present invention can be mounted in a battery-powered instrument such as a portable instrument.

Sixth Embodiment

Figure 17:
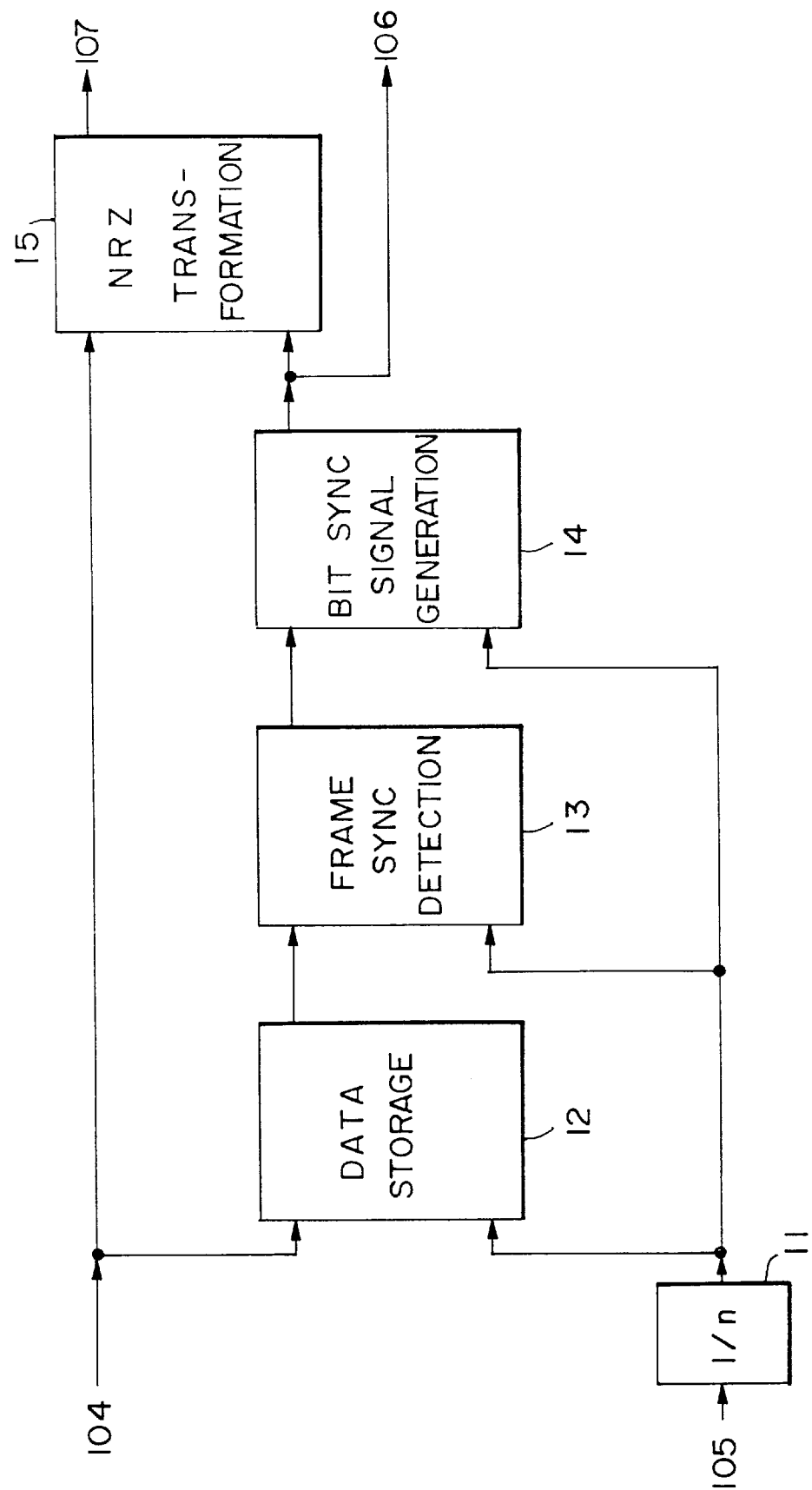
FIG. 17 is a functional block diagram of a sampling section in a sixth embodiment of a data decoding circuit constructed in accordance to the present invention.

The sixth embodiment relates to a specified sampling section which can be used in the data decoding circuits of the first to third embodiments. FIG. 17 is a functional block diagram of a sampling section 5 usable in the data decoding circuit according to the sixth embodiment. The sampling section 5 comprises a 1/n dividing section 11, a data storage section 12, a frame synchronization detecting section 13, a bit synchronization signal generating section 14 and an NRZ transforming section 15.

The 1/n dividing section 11 receives a phase synchronization signal 105 that is a clock signal having a frequency 2×n times the data transfer frequency fs and divides the received signal into 1/n to form an output signal having a frequency of 2×fs.

The data storage section 12 receives the signal having a frequency of 2×fs and also a received data regenerating signal 104. The received data regenerating signal 104 is then sampled with a frequency of 2×fs to form a data which is in turn stored therein.

The frame synchronization detecting section 13 receives the data stored in the data storage section 12 and the signal having its frequency of 2×fs and then outputs a frame synchronization detection signal for detecting when the data is coincide with a specific data train determined by the frame synchronization signal.

The bit synchronization signal generating section 14 receives the frame synchronization detecting signal and the signal having a frequency of 2×fs, the latter being then divided into ½ in synchronism with the frame synchronization detecting signal to form a bit synchronization signal 106.

The NRZ transforming section 15 receives the received data regenerating signal 104 and the bit synchronization signal 106. The received data regenerating signal 104 is then sampled by the bit synchronization signal 106 to form and output a serial binary data 107 of NRZ.

Figure 18:
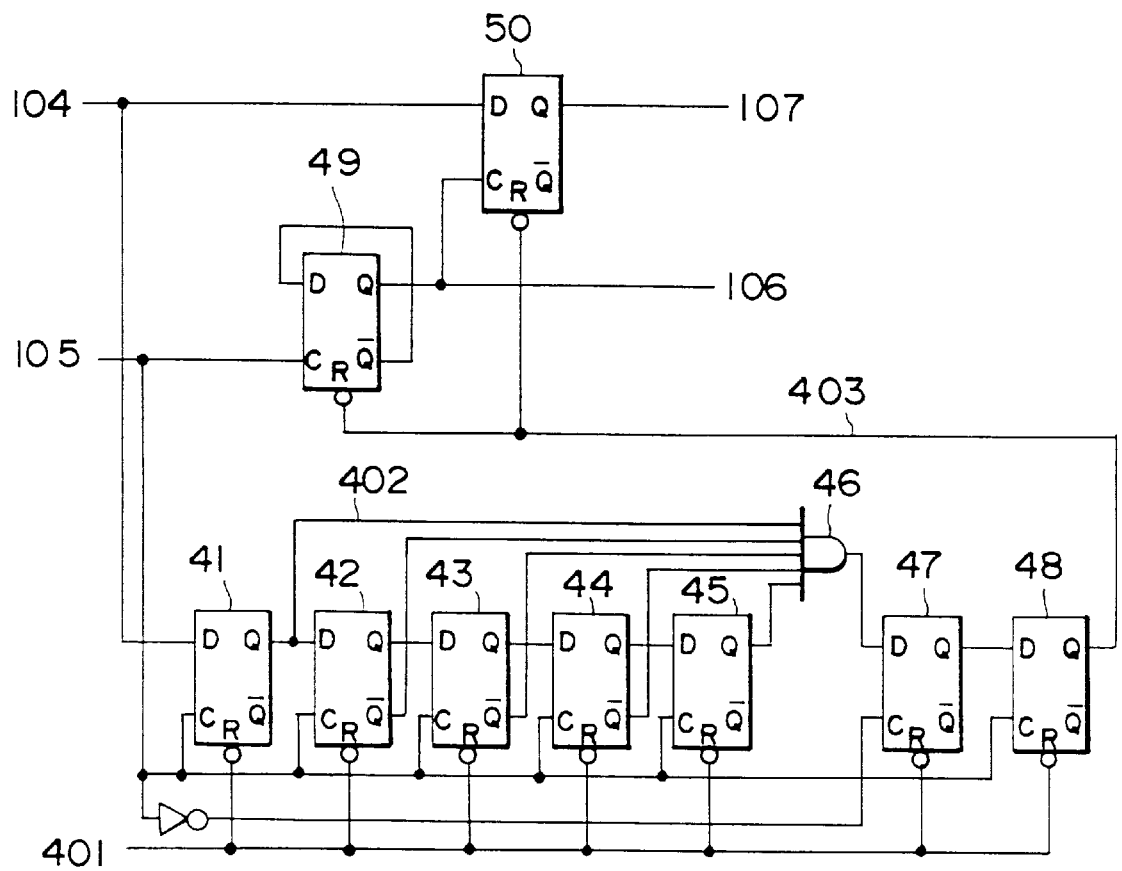
FIG. 18 is a circuit diagram of a sampling circuit in the sixth embodiment.

FIG. 18 is a circuit diagram of a sampling section usable in the sixth embodiment. The sampling section comprises FF's 41–45 each of which corresponds to the data storage section 12, a logic circuit 46 corresponding to the frame synchronization detecting section 13, FF's 47–49 each corresponding to the bit synchronization signal generating section 14 and an FF 50 corresponding to the NRZ transforming section.

In FIG. 18, 401 is a reset input signal which is used to initialize the FF's 41–45 each corresponding to the data storage section 12 when the received data becomes the non-data-received state.

Figure 19:
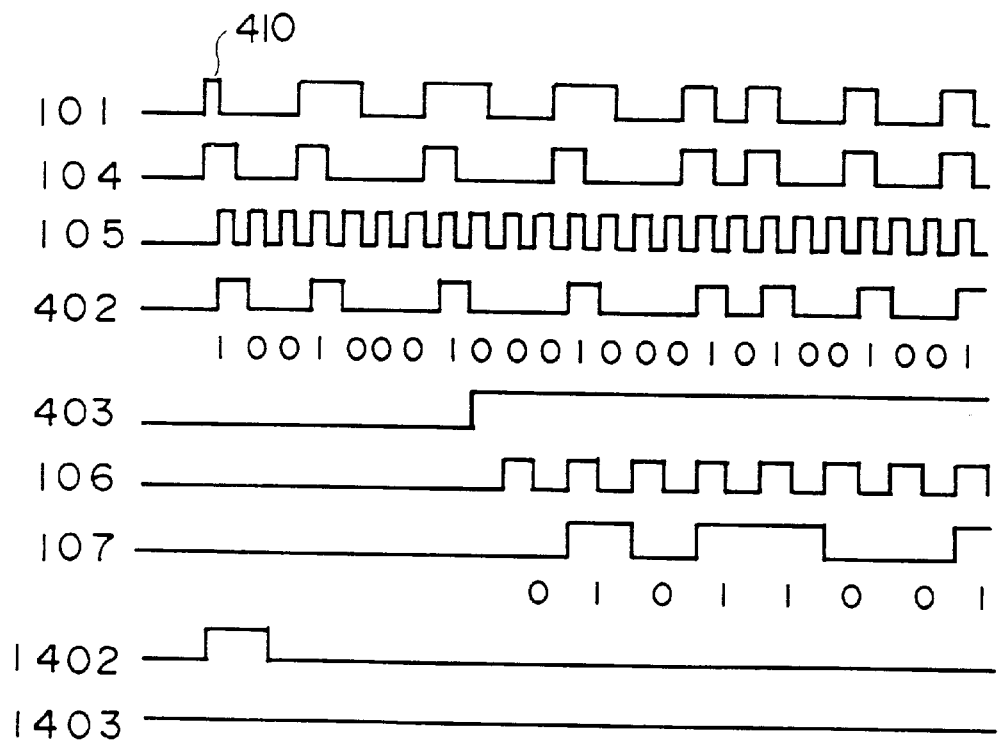
FIG. 19 is a timing chart of the circuit shown in FIG. 18.

FIG. 19 is a timing chart of the circuit shown in FIG. 18.

This embodiment is in a case where the frame synchronization signal is "1010 . . . " and then uses "10001" as a specific data that is sampled with a clock two times the data transfer frequency fs and used to detect the frame synchronization.

In FIG. 19, 101 is a received data having a signal component 410 which may represent a noise due to an external cause. 1402 and 1403 show timing charts of storage section first-stage data and frame synchronization detection signal which are sampled with the data transfer frequency fs when the frame synchronization is to be detected and when the specific data for detecting the frame synchronization is set to be "101". As will be apparent from FIG. 19, any noise raises a problem in that the synchronization cannot be accomplished even if a normal frame synchronization signal is subsequently inputted.

On the other hand, when the received data is sampled with a frequency two times the data transfer frequency fs and when the frame synchronization is detected, any normal frame synchronization signal can be exactly detected even though the received data has included a noise.

(Seventh Embodiment)

Figure 20:
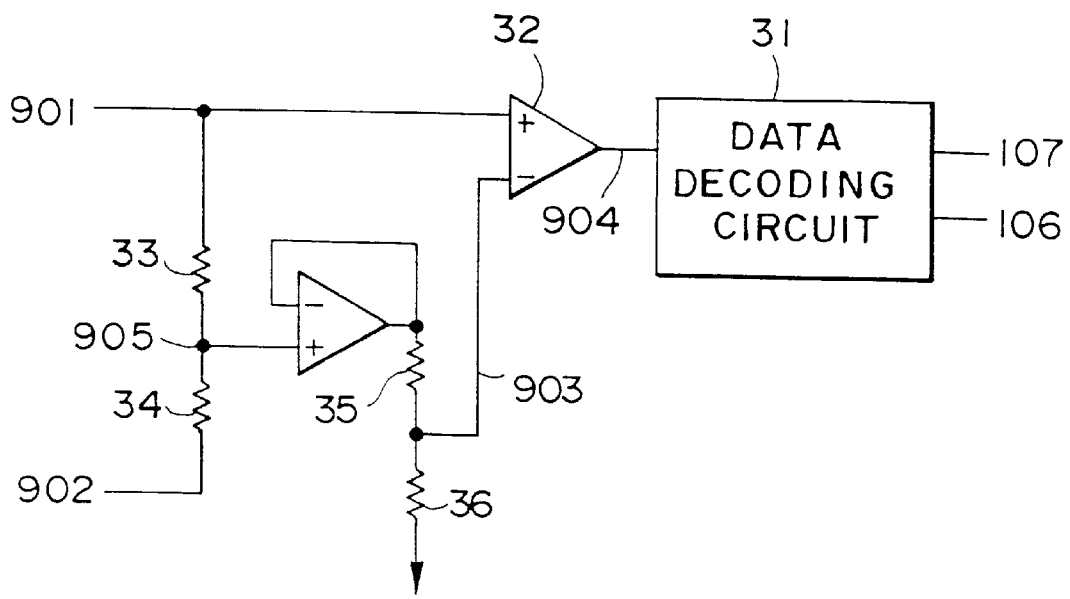
FIG. 20 is a circuit diagram of a received data generating circuit in a seventh embodiment of a data decoding system constructed in accordance with the present invention.

FIG. 20 is a circuit diagram of a received data generating circuit in a data decoding system according to the seventh embodiment. The seventh embodiment includes a data decoding circuit 31 which is the data decoding circuit of the present invention.

Inputs 901 and 902 are differential signals of a received signal. The central voltage in differential signals are determined and impedance transformed by resistances 33 and 34. A line between the central signal voltage and one power source system is divided to form an offset voltage 903 from the center of the differential signals by the use of resistances 35 and 36. This part functions as comparison input voltage generating means wherein the offset voltage 903 corresponds to the comparison input voltage. 32 is a comparator for comparing one of the differential signals 901 and the offset voltage 903 to form a difference which is in turn amplified and outputted therefrom.

Figure 21:
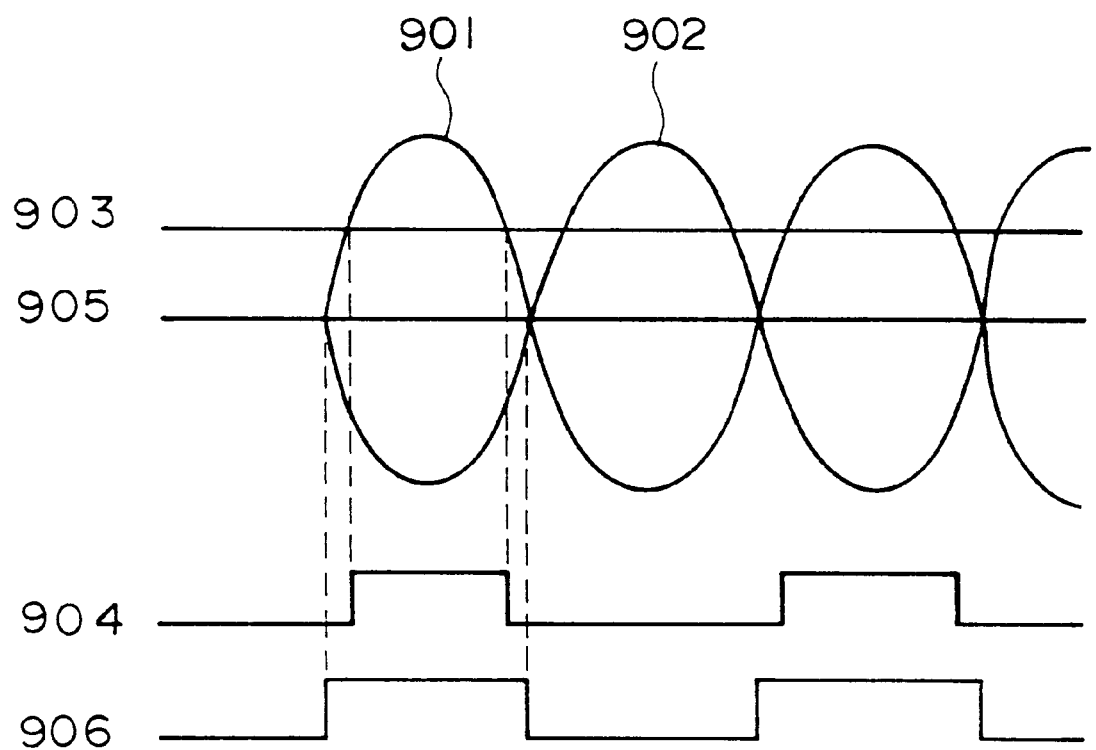
FIG. 21 is a timing chart of the circuit shown in FIG. 20.

FIG. 21 is a timing chart of the circuit shown in FIG. 20. 905 is the central voltage between the differential signals 901 and 902. 903 is another offset voltage obtained by offsetting the central voltage 905. 904 is the output of the comparator 32 when the offset voltage 903 is compared with the one differential signal 901. Where the received signal contains a noise not having the normal amplitude, the comparator output 904 will not react with such a noise by inputting the offset voltage 903 into the comparator, whereby the resistance to noise can be improved.

906 represents an ideal comparator output which can be provided by comparing the differential inputs 901 and 902 with each other. Since the comparator output 904 is an output in comparison with the offset voltage 903, it will have a pulse width smaller than that of the ideal comparator output 906. However, the performance of the data decoding circuits in the first to third embodiment or the sixth embodiment will not be influenced by the reduced pulse width of the received data. This is because each of the data decoding circuits is adapted to generate the received data regenerating signal from the received data being the comparator output and to sample the generated signal. When such a data decoding circuit is used, a data decoding system can be provided which can only use a single comparator in the received data generating circuit to generate a received data which is improved in resistance to a small-amplitude noise.

Eighth Embodiment

When the data decoding circuit or data decoding system according to the present invention is used in any of various electronic instruments, that electronic instrument can be inexpensive, has an improved resistance to noise and can be operated with a reduced power consumption.

Figure 23:
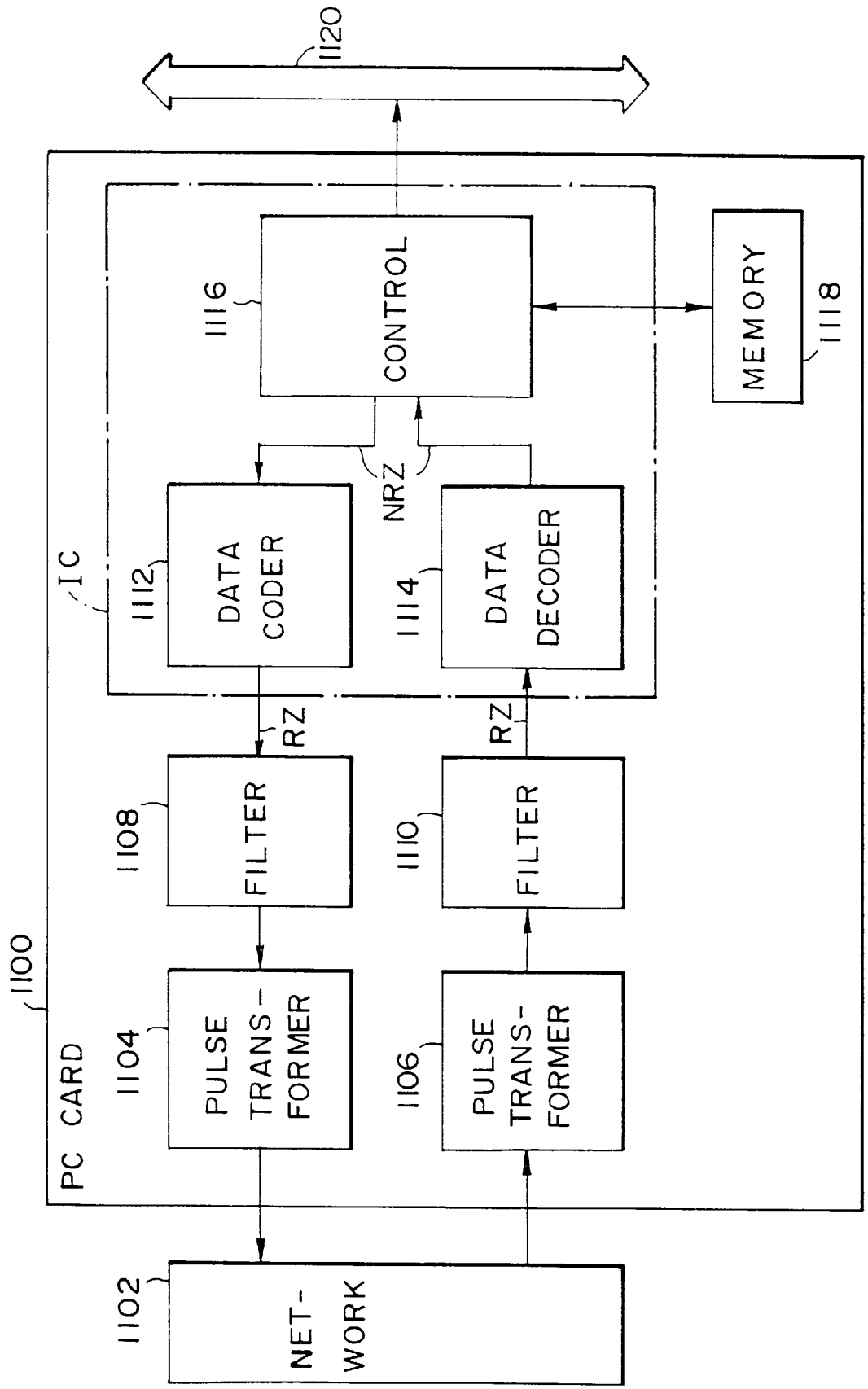
FIG. 23 is a functional block diagram of a personal computer (PC) card in a wire local area network (LAN) according to an eighth-embodiment of the present invention.

FIG. 23 is a functional block diagram of a PC card 1100 used in a wire LAN according to the eighth embodiment. The PC card 1100 comprises pulse transformers 1104 and 1106, filters 1108 and 1110, a data coding circuit 1112, a data decoding circuit 1114, a control section 1116 and a memory 1118. The data decoding circuit 1114 is the data decoding circuit of the present invention.

The PC card 1100 receives a received signal from a network 1102. The pulse transformer 1106 and filter 1110 generate a received data of RZ from the received signal. The data decoding circuit 1114 receives and decodes the received data of RZ into an NRZ data. The control section 1106 receives the NRZ data which is in turn outputted toward the memory 1118 and an external PC bus 1120.

The data decoding circuit of the present invention can be used in Ethernet switch hub. Ninth Embodiment The present invention may be applied to any communication instrument which can use other Manchester coded data or a transformation of the RZ data from the data transfer means to NRZ data. Such instruments include infra-red communication receiver circuits, wireless LAN receiver circuits, reading circuits of digital storage devices and others.

Figure 24:
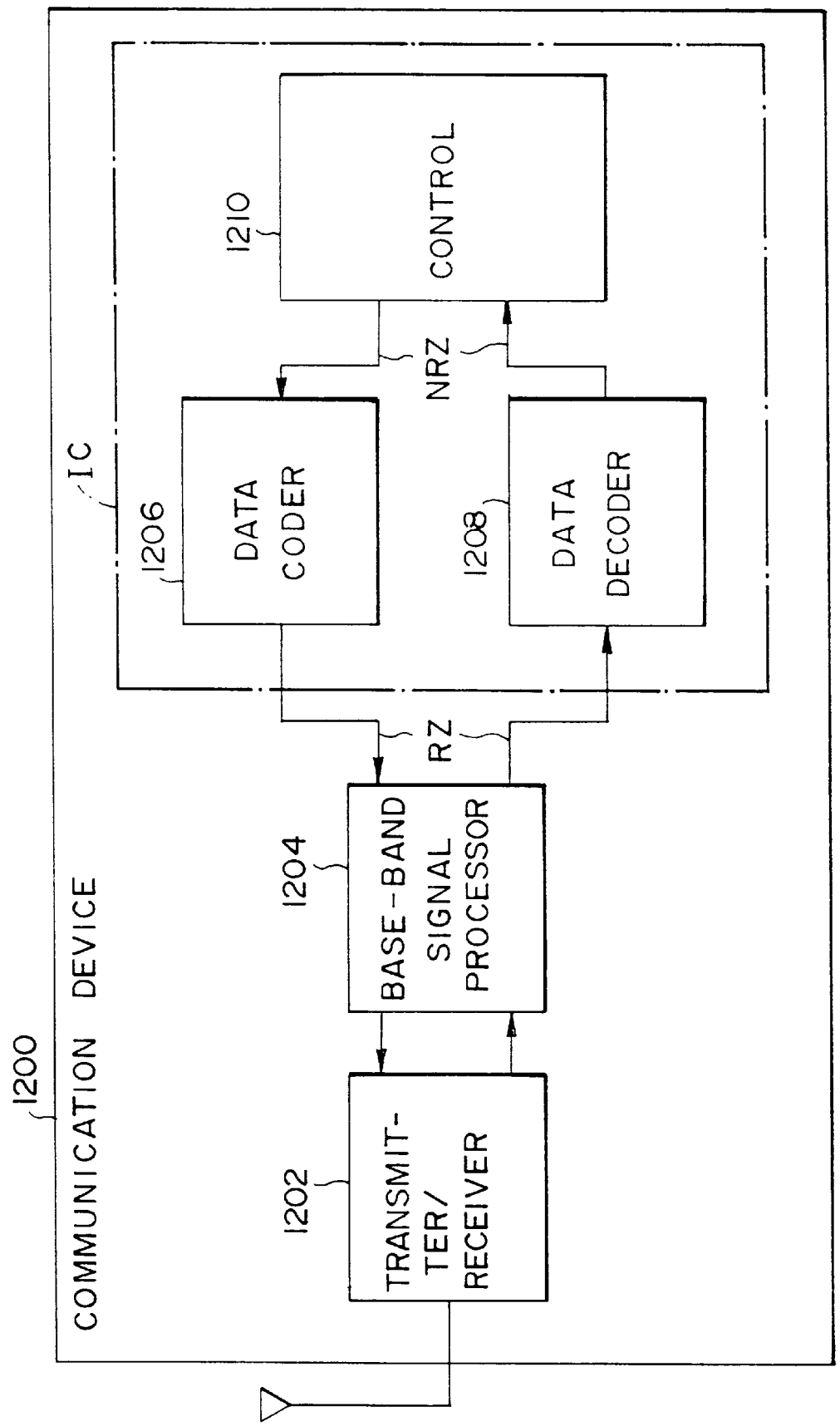
FIG. 24 is a functional block diagram of a communication device such as a portable telephone constructed according to a ninth embodiment of the present invention.

FIG. 24 is a functional block diagram of a communication device such as a digital portable telephone according to the ninth embodiment of the present invention. The communication device 1200 comprises a transmitter/receiver section 1202, a base-band signal processing section 1204, a data coding circuit 1206, a data decoding circuit 1208 and a control section 1210. The data decoding circuit 1208 is the data decoding circuit of the present invention.

The transmitter/receiver section 1202 of the communication device 1200 receives a received signal and outputs an amplified carrier wave. The base-band signal processing section 1204 receives the amplified carrier wave and outputs a received data of RZ. The data decoding circuit 1208 receives the received data and decodes it into a data of NRZ. The control section 1210 receives the NRZ data.

What is claimed is:

1. A data decoding circuit for regenerating a bit synchronization signal from a data received by using a code in which a binary value can be detected through a transition of voltage at a central area of a bit cell and for transforming received data into a serial binary data, said data decoding circuit comprising:

edge detection means for detecting a transition point in said received data;

pulse generating means for generating a phase comparing timing signal having a pulse width of substantially 1/(4×fs) when fs is a data transfer frequency and a received data regenerating signal having a pulse width of substantially 1/(2×fs) in synchronism with an output of said edge detection means;

phase synchronization oscillation means synchronized in phase with said phase comparing timing signal for outputting a signal having a frequency which is n times said data transfer frequency fs; and sampling means including means for generating said bit synchronization signal by dividing a frequency of a signal outputted from said phase synchronization oscillation means into 1/n, means for sampling said received data regenerating signal based on said bit synchronization signal and means for transforming sampled signal into said serial binary data.

2. The data decoding circuit as defined in claim 1, wherein said phase synchronization oscillation means outputs a signal having a frequency which is n=2m (m:natural number) times said data transfer frequency fs; and wherein said sampling means comprises:

means for generating a preamble sampling signal having a frequency which is two times said data transfer frequency fs and obtained by dividing a frequency of a signal outputted from said phase synchronization oscillation means into 1/m;

means for sampling said received data regenerating signal with said preamble sampling signal and for storing a sampled data;

frame synchronization detecting means for detecting synchronization of said stored sampled data with a frame synchronization data by recognizing that said stored sampled data is a given data;

bit synchronization signal generating means for dividing said preamble sampling signal into ½ in synchronism with an output of said frame synchronization detecting means to generate said bit synchronization signal having a frequency equal to said data transfer frequency fs; and means for sampling said received data regenerating signal with said bit synchronization signal after detection of frame synchronization to transform a sampled signal into a non-return-to-zero serial binary data.

3. A data decoding system comprising:

received data generating means for receiving a code in which a binary value can be detected through a transition of voltage at a central area of a bit cell as differential signals, and for generating a received data of a digital signal based on said differential signals; and a data decoding circuit as defined in claim 1 which receives said received data, generates a bit synchronization signal from said received data, and transforms said bit synchronization signal into a serial binary data;

wherein said received data generating means comprises:

comparison input voltage generating means for generating a comparison input voltage based on said differential signals; and means for comparing said comparison input voltage generated by said comparison input voltage generating means with a voltage of one of said differential signals to generate said received data of said digital signal.

4. The data decoding system as defined in claim 3, wherein said comparison input voltage generating means comprises:

means for receiving said differential signals to generate an intermediate voltage; and means for dividing a voltage between said intermediate voltage and a first source voltage.

5. An electronic equipment for receiving a code in which a binary value can be detected through a transition of voltage at a central area of a bit cell as differential signals, said electronic equipment comprising:

a data decoding system as defined in claim 3 which receives said differential signals to decode data of said differential signals; and means for receiving and processing a data decoded by said data decoding system.

6. An electronic equipment for receiving a code in which a binary value can be detected through a transition of voltage at a central area of a bit cell as a received signal, said electronic equipment comprising:

data decoding means for decoding said received signal into a decoded data; and means for receiving and processing said decoded data from said data decoding means; and wherein data decoding means includes a data decoding circuit as defined in claim 1.

7. A data decoding circuit for regenerating a bit synchronization signal from a data received by using a code in which a binary value can be detected through a transition of voltage at a central area of a bit cell and for transforming received data into a serial binary data, said data decoding circuit comprising:

edge detection means for detecting a transition point in said received data;

reference voltage generating means including:

a first voltage-controlled oscillation circuit which is controlled by an operation control input signal to start and stop an oscillation;

means for oscillating said first voltage-controlled oscillation circuit with a frequency which is n times a data transfer frequency fs; and means for outputting a reference voltage depending on a control voltage of said first voltage-controlled oscillation circuit;

pulse generating means including:

a second voltage-controlled oscillation circuit having the same structure as in said first voltage-controlled oscillation circuit and being supplied with a control voltage depending on an output of said reference voltage generating means and also supplied with an operation control input signal depending on an output of said edge detection means; and means for generating a phase comparing timing signal having a pulse width of substantially 1/(4×fs) and a received data regenerating signal having a pulse width of substantially 1/(2×fs) based on an output of said second voltage-controlled oscillation circuit;

phase synchronization oscillation means including:

a third voltage-controlled oscillation circuit having the same structure as in said first voltage-controlled oscillation circuit and being supplied with a control voltage depending on an output of said reference voltage generating means;

means for synchronizing said phase comparing timing signal with an output of said third voltage-controlled oscillation circuit; and means for outputting a signal which is synchronized in phase with said phase comparing timing signal and has a frequency which is n times said data transfer frequency fs;

sampling means including:

means for dividing a frequency of a signal outputted from said phase synchronization oscillation means into 1/n to generate said bit synchronization signal;

means for sampling said received data regenerating signal based on said bit synchronization signal; and means for transforming sampled signal into said serial binary data.

8. The data decoding circuit as defined in claim 7, wherein said phase synchronization oscillation means outputs a signal having a frequency which is N=2m (m:natural number) times said data transfer frequency fs; and wherein said sampling means comprises:

means for generating a preamble sampling signal having a frequency which is two times said data transfer frequency fs and obtained by dividing a frequency of a signal outputted from said phase synchronization oscillation means into 1/m;

means for sampling said received data regenerating signal with said preamble sampling signal and for storing a sampled data;

frame synchronization detecting means for detecting synchronization of said stored sampled data with a frame synchronization data by recognizing that said stored sampled data is a given data;

bit synchronization signal-generating means for dividing said preamble sampling signal into ½ in synchronism with an output of said frame synchronization detecting means to generate said bit synchronization signal having a frequency equal to said data transfer frequency fs; and means for sampling said received data regenerating signal with said bit synchronization signal after detection of frame synchronization to transform a sampled signal into a non-return-to-zero serial binary data.

9. The data decoding circuit as defined in claim 8, wherein at least one of said first to third voltage-controlled oscillation circuits comprises:

inverting amplifier circuits equal in number to (2×k+1) (0<k), said inverting amplifier circuits being connected together in a ring;

means for controlling an oscillation frequency generated by said inverting amplifier circuits with an external control voltage;

first switch means for electrically disconnecting between the $N_1$-th inverting amplifier circuit and the $(N_1+1)$-th inverting amplifier circuit among said (2×k+1) inverting amplifier circuits when said operation control input signal is in a first state, and for electrically connecting the first-mentioned two inverting amplifier circuits when said operation control input signal is in a second state, second switch means for electrically disconnecting between the $N_2$-th inverting amplifier circuit and the $(N_2+1)$-th inverting amplifier circuit when said operation control input signal is in the first state and for electrically connecting the last-mentioned two inverting amplifier circuits when said operation control input signal is in the second state, . . . and m-th (m being three or more) switch means for electrically disconnecting between the Nm th inverting amplifier circuit and the $(N_m+1)$-th inverting amplifier circuit when said operation control input signal is in the first state and for electrically connecting the last-mentioned two inverting amplifier circuits when said operation control input signal is in the second state; and first voltage setting means for setting inputs of said $N_1$-th and $(N_1+1)$-th inverting amplifier circuits at the same voltage when said operation control input signal is in the first state, second voltage setting means for setting inputs of the $N_2$-th and $(N_2+1)$-th inverting amplifier circuits at-the same voltage when said operation control input signal is in the first state, . . . and m-th voltage setting means for setting inputs of the $N_m$-th and $(N_m+1)$-th inverting amplifier circuits at the same voltage when said operation control input signal is in the first state.

10. The data decoding circuit as defined in claim 9, wherein at least one of a ratio of an output load capacity of said $N_1$-th inverting amplifier circuit to an input load capacity of said $(N_1+1)$-th inverting amplifier circuit, a ratio of an output load capacity of said $N_2$-th inverting amplifier circuit to an input load capacity of said $(N_2+1)$-th inverting amplifier circuit, . . . and a ratio of an output load capacity of said $N_m$-th inverting amplifier circuit to an input load capacity of said $(N_m+1)$-th inverting amplifier circuit is different from the others.

11. The data decoding circuit as defined in claim 10, wherein the sum of the output load capacity of said $N_1$-th inverting amplifier circuit and the input load capacity of said $(N_1+1)$-th inverting amplifier circuit, the sum of the output load capacity of said $N_2$-th inverting amplifier circuit and the input load capacity of said $(N_2+1)$-th inverting amplifier circuit, . . . and the sum of the output load capacity of said $N_m$-th inverting amplifier circuit and the input load capacity of said $(N_m+1)$-th inverting amplifier circuit are equalized.

12. A data decoding system comprising:

received data generating means for receiving a code in which a binary value can be detected through a transition of voltage at a central area of a bit cell as differential signals, and for generating a received data of a digital signal based on said differential signals; and a data decoding circuit as defined in claim 8 which receives said received data, generates a bit synchronization signal from said received data, and transforms said bit synchronization signal into a serial binary data;

wherein said received data generating means comprises:

comparison input voltage generating means for generating a comparison input voltage based on said differential signals; and means for comparing said comparison input voltage generated by said comparison input voltage generating means with a voltage of one of said differential signals to generate said received data of said digital signal.

13. The data decoding system as defined in claim 12, wherein said comparison input voltage generating means comprises:

means for receiving said differential signals to generate an intermediate voltage; and means for dividing a voltage between said intermediate voltage and a first source voltage.

14. An electronic equipment for receiving a code in which a binary value can be detected through a transition of voltage at a central area of a bit cell as a received signal, said electronic equipment comprising:

data decoding means for decoding said received signal into a decoded data; and means for receiving and processing said decoded data from said data decoding means; and wherein data decoding means includes a data decoding circuit as defined in claim 8.

15. An electronic equipment for receiving a code in which a binary value can be detected through a transition of voltage at a central area of a bit cell as differential signals, said electronic equipment comprising:

a data decoding system as defined in claim 12 which receives said differential signals to decode data of said differential signals; and means for receiving and processing a data decoded by said data decoding system.

16. The data decoding circuit as defined in claim 7, wherein at least one of said first to third voltage-controlled oscillation circuits comprises:

inverting amplifier circuits equal in number to (2×k+1) (0<k), said inverting amplifier circuits being connected together in a ring;

means for controlling an oscillation frequency generated by said inverting amplifier circuits with an external control voltage;

first switch means for electrically disconnecting between the $N_1$-th inverting amplifier circuit and the $(N_1+1)$-th inverting amplifier circuit among said (2×k+1) inverting amplifier circuits when said operation control input signal is in a first state, and for electrically connecting the first-mentioned two inverting amplifier circuits when said operation control input signal is in a second state, second switch means for electrically disconnecting between the $N_2$-th inverting amplifier circuit and the $(N_2+1)$-th inverting amplifier circuit when said operation control input signal is in the first state and for electrically connecting the last-mentioned two inverting amplifier circuits when said operation control input signal is in the second state, . . . and m-th (m being three or more) switch means for electrically disconnecting between the $N_m$-th inverting amplifier circuit and the $(N_m+1)$-th inverting amplifier circuit when said operation control input signal is in the first state and for electrically connecting the last-mentioned two inverting amplifier circuits when said operation control input signal is in the second state; and first voltage setting means for setting inputs of said $N_1$-th and $(N_1+1)$-th inverting amplifier circuits at the same voltage when said operation control input signal is in the first state, second voltage setting means for setting inputs of the $N_2$-th and $(N_2+1)$-th inverting amplifier circuits at the same voltage when said operation control input signal is in the first state, . . . and m-th voltage setting means for setting inputs of the $N_m$-th and $(N_m+1)$-th inverting amplifier circuits at the same voltage when said operation control input signal is in the first state.

17. The data decoding circuit as defined in claim 16, wherein at least one of a ratio of an output load capacity of said $N_1$-th inverting amplifier circuit to an input load capacity of said $(N_1+1)$-th inverting amplifier circuit, a ratio of an output load capacity of said $N_2$-th inverting amplifier circuit to an input load capacity of said $(N_2+1)$-th inverting amplifier circuit, . . . and a ratio of an output load capacity of said $N_m$-th inverting amplifier circuit to an input load capacity of said $(N_m+1)$-th inverting amplifier circuit is different from the others.

18. The data decoding circuit as defined in claim 17, wherein the sum of the output load capacity of said $N_1$-th inverting amplifier circuit and the input load capacity of said $(N_1+1)$-th inverting amplifier circuit, the sum of the output load capacity of said $N_2$-th inverting amplifier circuit and the input load capacity of said $(N_2+1)$-th inverting amplifier circuit, . . . and the sum of the output load capacity of said $N_m$-th inverting amplifier circuit and the input load capacity of said $(N_m+1)$-th inverting amplifier circuit are equalized.

19. A data decoding system comprising:

received data generating means for receiving a code in which a binary value can be detected through a transition of voltage at a central area of a bit cell as differential signals, and for generating a received data of a digital signal based on said differential signals; and a data decoding circuit as defined in claim 18 which receives said received data, generates a bit synchronization signal from said received data, and transforms said bit synchronization signal into a serial binary data;

wherein said received data generating means comprises:

comparison input voltage generating means for generating a comparison input voltage based on said differential signals; and means for comparing said comparison input voltage generated by said comparison input voltage generating means with a voltage of one of said differential signals to generate said received data of said digital signal.

20. A data decoding system comprising:

received data generating means for receiving a code in which a binary value can be detected through a transition of voltage at a central area of a bit cell as differential signals, and for generating a received data of a digital signal based on said differential signals; and a data decoding circuit as defined in claim 17 which receives said received data, generates a bit synchronization signal from said received data, and transforms said bit synchronization signal into a serial binary data;

wherein said received data generating means comprises:

comparison input voltage generating means for generating a comparison input voltage based on said differential signals; and means for comparing said comparison input voltage generated by said comparison input voltage generating means with a voltage of one of said differential signals to generate said received data of said digital signal.

21. A data decoding system comprising:

received data generating means for receiving a code in which a binary value can be detected through a transition of voltage at a central area of a bit cell as differential signals, and for generating a received data of a digital signal based on said differential signals; and a data decoding circuit as defined in claim 16 which receives said received data, generates a bit synchronization signal from said received data, and transforms said bit synchronization signal into a serial binary data;

wherein said received data generating means comprises:
comparison input voltage generating means for generating a comparison input voltage based on said differential signals; and
means for comparing said comparison input voltage generated by said comparison input voltage generating means with a voltage of one of said differential signals to generate said received data of said digital signal.

22. The data decoding system as defined in claim 21,
wherein said comparison input voltage generating means comprises:
means for receiving said differential signals to generate an intermediate voltage; and
means for dividing a voltage between said intermediate voltage and a first source voltage.

23. An electronic equipment for receiving a code in which a binary value can be detected through a transition of voltage at a central area of a bit cell as differential signals, said electronic equipment comprising:
a data decoding system as defined in claim 21 which receives said differential signals to decode data of said differential signals; and
means for receiving and processing a data decoded by said data decoding system.

24. An electronic equipment for receiving a code in which a binary value can be detected through a transition of voltage at a central area of a bit cell as a received signal, said electronic equipment comprising:
data decoding means for decoding said received signal into a decoded data; and
means for receiving and processing said decoded data from said data decoding means; and
wherein data decoding means includes a data decoding circuit as defined in claim 16.

25. A data decoding circuit for regenerating a bit synchronization signal from a data received by using a code in which a binary value can be detected through a transition of voltage at a central area of a bit cell and for transforming received data into a serial binary data, said data decoding circuit comprising:
edge detection means for detecting a transition point in said received data;
line monitoring means for detecting a data-received state and a non-data-received state based on an output of said edge detection means;
reference signal generating means including:
a first voltage-controlled oscillation circuit which is controlled by an operation control input signal to start and stop an oscillation;
means for oscillating said first voltage-controlled oscillation circuit with a frequency which is n times a data transfer frequency fs for said received data when said non-data-received state is detected by said line monitoring means; and
means for synchronizing said first voltage-controlled oscillation circuit with a phase comparing timing signal synchronized with said received data and also for oscillating said first voltage-controlled oscillation circuit with a frequency which is n times said data transfer frequency fs;
pulse generating means including:
a second voltage-controlled oscillation circuit of the same structure as in said first voltage-controlled oscillation circuit and being supplied with a control voltage depending on an output of said first voltage-controlled oscillation circuit and with an operation control input signal depending on an output of said edge detection means; and
means for generating said phase comparing timing signal having a pulse width of substantially 1/(4×fs) and being synchronized with said received data, and a received data regenerating signal having a pulse width of substantially 1/(2×fs); and
sampling means including:
means for dividing a frequency of a signal outputted from said reference signal generating means into 1/n to generate said bit synchronization signal;
means for sampling said received data regenerating signal based on said bit synchronization signal; and
means for transforming sampled signal into said serial binary data.

26. The data decoding circuit as defined in claim 25;
wherein said reference signal generating means outputs a signal having a frequency which is N=2m (m:natural number) times said data transfer frequency fs; and
wherein said sampling means comprises:
means for generating a preamble sampling signal having a frequency which is two times said data transfer frequency fs and obtained by dividing a frequency of a signal outputted from said reference signal generating means into 1/m;
means for sampling said received data regenerating signal with said preamble sampling signal and for storing a sampled data;
frame synchronization detecting means for detecting synchronization of said stored sampled data with a frame synchronization data by recognizing that said stored sampled data is a given data;
bit synchronization signal generating means for dividing said preamble sampling signal into ½ in synchronism with an output of said frame synchronization detecting means to generate said bit synchronization signal having a frequency equal to said data transfer frequency fs; and
means for sampling said received data regenerating signal with said bit synchronization signal after detection of frame synchronization to transform a sampled signal into a non-return-to-zero serial binary data.

27. The data decoding circuit as defined in claim 25,
wherein at least one of said first and second voltage-controlled oscillation circuits comprises:
inverting amplifier circuits equal in number to (2×k+1) (0<k), said inverting amplifier circuits being connected together in a ring;
means for controlling an oscillation frequency generated by said inverting amplifier circuits with an external control voltage;
first switch means for electrically disconnecting between the $N_1$-th inverting amplifier circuit and the $(N_1+1)$-th inverting amplifier circuit among said (2×k+1) inverting amplifier circuits when said operation control input signal is in a first state, and for electrically connecting the first-mentioned two inverting amplifier circuits when said operation control input signal is in a second state, second switch means for electrically disconnecting between the $N_2$-th inverting amplifier circuit and the $(N_2+1)$-th inverting amplifier circuit when said operation control input signal is in the first state and for electrically connecting the last-mentioned two inverting amplifier circuits when said operation control input signal is in the second state, . . . and m-th (m being three or more) switch means for electrically disconnecting between the $N_m$-th inverting amplifier circuit and the $(N_m+1)$-th inverting amplifier circuit when said operation control input signal is in the first state and for electrically connecting the last-mentioned two inverting amplifier circuits when said operation control input signal is in the second state; and first voltage setting means for setting inputs of said $N_1$-th and $(N_1+1)$-th inverting amplifier circuits at the same voltage when said operation control input signal is in the first state, second voltage setting means for setting inputs of the $N_2$-th and $(N_2+1)$-th inverting amplifier circuits at the same voltage when said operation control input signal is in the first state, . . . and m-th voltage setting means for setting inputs of the $N_m$-th and $(N_m+1)$-th inverting amplifier circuits at the same voltage when said operation control input signal is in the first state.

28. The data decoding circuit as defined in claim 27,
wherein at least one of a ratio of an output load capacity of said $N_1$-th inverting amplifier circuit to an input load capacity of said $(N_1+1)$-th inverting amplifier circuit, a ratio of an output load capacity of said $N_2$-th inverting amplifier circuit to an input load capacity of said $(N_2+1)$-th inverting amplifier circuit, . . . and a ratio of an output load capacity of said $N_m$-th inverting amplifier circuit to an input load capacity of said $(N_m+1)$-th inverting amplifier circuit is different from the others.

29. The data decoding circuit as defined in claim 28,
wherein the sum of the output load capacity of said $N_1$-th inverting amplifier circuit and the input load capacity of said $(N_1+1)$-th inverting amplifier circuit, the sum of the output load capacity of said $N_2$-th inverting amplifier circuit and the input load capacity of said $(N_2+1)$-th inverting amplifier circuit, . . . and the sum of the output load capacity of said $N_m$-th inverting amplifier circuit and the input load capacity of said $(N_m+1)$-th inverting amplifier circuit are equalized.

30. A voltage-controlled oscillation circuit comprising:
inverting amplifier circuits equal in number to $(2 \times k+1)$ ($0<k$), said inverting amplifier circuits being connected together in a ring;

means for controlling an oscillation frequency generated by said inverting amplifier circuits with an external control voltage;

first switch means for electrically disconnecting between the $N_1$-th inverting amplifier circuit and the $(N_1+1)$-th inverting amplifier circuit among said $(2 \times k+1)$ inverting amplifier circuits when an operation control input signal is in a first state, and for electrically connecting the first-mentioned two inverting amplifier circuits when said operation control input signal is in a second state, second switch means for electrically disconnecting between the $N_2$-th inverting amplifier circuit and the $(N_2+1)$-th inverting amplifier circuit when said operation control input signal is in the first state and for electrically connecting the last-mentioned two inverting amplifier circuits when said operation control input signal is in the second state, . . . and m-th (m being three or more) switch means for electrically disconnecting between the $N_m$-th inverting amplifier circuit and the $(N_m+1)$-th inverting amplifier circuit when said operation control input signal is in the first state and for electrically connecting the last-mentioned two inverting amplifier circuits when said operation control input signal is in the second state; and first voltage setting means for setting inputs of said $N_1$-th and $(N_1+1)$-th inverting amplifier circuits at the same voltage when said operation control input signal is in the first state, second voltage setting means for setting inputs of the $N_2$-th and $(N_2+1)$-th inverting amplifier circuits at the same voltage when said operation control input signal is in the first state, . . . and m-th voltage setting means for setting inputs of the $N_m$-th and $(N_m+1)$-th inverting amplifier circuits at the same voltage when said operation control input signal is in the first state.

31. The voltage-controlled oscillation circuit as defined in claim 30,
wherein at least one of a ratio of an output load capacity of said $N_1$-th inverting amplifier circuit to an input load capacity of said $(N_1+1)$-th inverting amplifier circuit, a ratio of an output load capacity of said $N_2$-th inverting amplifier circuit to an input load capacity of said $(N_2+1)$-th inverting amplifier circuit, . . . and a ratio of an output load capacity of said $N_m$-th inverting amplifier circuit to an input load capacity of said $(N_m+1)$-th inverting amplifier circuit is different from the others.

32. A voltage-controlled oscillation circuit as defined in claim 31,
wherein the sum of the output load capacity of said $N_1$-th inverting amplifier circuit and the input load capacity of said $(N_1+1)$-th inverting amplifier circuit, the sum of the output load capacity of said $N_2$-th inverting amplifier circuit and the input load capacity of said $(N_2+1)$-th inverting amplifier circuit, . . . and the sum of the output load capacity of said $N_m$-th inverting amplifier circuit and the input load capacity of said $(N_m+1)$-th inverting amplifier circuit are equalized.

33. A data decoding method of regenerating a bit synchronizing signal from a data received by using a code in which a binary value can be detected through a transition of voltage at a central area of a bit cell and for transforming received data into a serial binary data, said data decoding method comprising:

a first step of detecting a transition point in said received data;

a second step of generating a phase comparing timing signal having a pulse width of substantially $1/(4 \times fs)$ when fs is a data transfer frequency and received data regenerating signal having a pulse width of substantially $1/(2 \times fs)$ in synchronism with an output of said first step;

a third step of outputting a signal having a frequency which is n times said data transfer frequency fs, said step synchronized in phase with said phase comparing timing signal; and a fourth step of generating said bit synchronization signal by dividing a frequency of a signal outputted from said third step into 1/n, the step of sampling said received data regenerating signal based on said bit synchronization signal and the step of transforming sampled signal into said serial binary data.

* * * * *